(12) United States Patent
Zhang et al.

(10) Patent No.: US 11,265,045 B2
(45) Date of Patent: Mar. 1, 2022

(54) CHANNEL FEEDBACK METHOD AND RELATED DEVICE

(71) Applicant: Huawei Technologies Co., Ltd., Shenzhen (CN)

(72) Inventors: Ruiqi Zhang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 16/811,002

(22) Filed: Mar. 6, 2020

(65) Prior Publication Data

US 2020/0212966 A1 Jul. 2, 2020

Related U.S. Application Data

(63) Continuation of application No. PCT/CN2018/102962, filed on Aug. 29, 2018.

(30) Foreign Application Priority Data

Sep. 8, 2017 (CN) .......................... 201710810156.X

(51) Int. Cl.
*H04B 7/0417* (2017.01)
*H04B 7/0456* (2017.01)
*H04B 7/06* (2006.01)

(52) U.S. Cl.
CPC ......... *H04B 7/0417* (2013.01); *H04B 7/0456* (2013.01); *H04B 7/0626* (2013.01); *H04B 7/0663* (2013.01)

(58) Field of Classification Search
CPC .. H04B 7/0626; H04B 7/0456; H04B 7/0417; H04B 7/0413; H04B 7/0663

(Continued)

(56) References Cited

U.S. PATENT DOCUMENTS 9,698,951 B2 7/2017 Kim et al.
9,806,780 B2 10/2017 Ji et al.
(Continued)

FOREIGN PATENT DOCUMENTS

CN 101325442 A 12/2008
CN 102237969 A 11/2011
(Continued)

OTHER PUBLICATIONS

Mediatek Inc., "View on the Remaining Issue for CSI Reporting Type II", 3GPP TSG RAN WG1 Meeting #88bis, R1-1704472, Apr. 3-7, 2017, 4 pages, Spokane, USA.

(Continued)

*Primary Examiner* — Rownak Islam
(74) *Attorney, Agent, or Firm* — Slater Matsil, LLP

(57) ABSTRACT

A method in the embodiments of this application includes: generating, by a terminal device, first information, where the first information includes parameters $q, m_1, m_2, \ldots, m_L$, and indication information of a vector V; q is an integer, and $q<Q$; Q is an integer, and $Q>1$; $0 \le m_l \le N-1$, and $1 \le l \le L$; $L>1$, N, L, and l are integers, and N is a quantity of subbands in a frequency domain bandwidth; and the vector V includes L elements and satisfies $V = F_q \times C$, where C is a vector formed by N elements $c^1, \ldots, c^N$, $C=[c^1 \ c^2 \ \ldots \ c^N]^T$, $c^k$ is used to indicate channel state information on a $k^{th}$ frequency domain subband, $c^k$ is a complex number, a modulus of $c^k$ is $|c^k| \le 1$, and $1 \le k \le N$; and sending, by the terminal device, the first information to a network device.

20 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2008/0229177 A1 | 9/2008 | Kotecha | |
| 2015/0349937 A1 | 12/2015 | Kim et al. | |
| 2016/0344458 A1* | 11/2016 | Zhao | H04B 7/0456 |
| 2020/0178241 A1* | 6/2020 | Wu | H04L 1/0026 |
| 2020/0213995 A1 | 7/2020 | Kim et al. | |
| 2021/0328646 A1* | 10/2021 | Wu | H04B 7/0639 |

FOREIGN PATENT DOCUMENTS

| | | | |
|---|---|---|---|
| CN | 102291199 A | 12/2011 | |
| CN | 106537814 A | 3/2017 | |
| CN | 106559889 A | 4/2017 | |
| EP | 3125450 A1 | 2/2017 | |
| WO | 2011146606 A1 | 11/2011 | |
| WO | 2014109613 A1 | 7/2014 | |

OTHER PUBLICATIONS

Ericsson, "Frequency parametrization for Type II CSI feedback", 3GPP TSG-RAN WG1 #89ah-NR, R1-1711035, Jun. 27-30, 2017, 8 pages, Qingdao, China.

* cited by examiner

Accurate sampling → After Fourier transform

Network device (Base station) — Uplink channel / Downlink channel — Terminal device (User equipment)

CHANNEL FEEDBACK METHOD AND RELATED DEVICE

CROSS-REFERENCE TO RELATED APPLICATIONS

This application is continuation of International Application No. PCT/CN2018/102962, filed on Aug. 29, 2018, which claims priority to Chinese Patent Application No. 201710810156.X, filed on Sep. 8, 2017. The disclosures of the aforementioned applications are hereby incorporated by reference in their entireties.

TECHNICAL FIELD

This application relates to the communications field, and in particular, to a channel feedback method and a related device.

BACKGROUND

A multiple-input and multiple-output (MIMO) technology is widely used in a long term evolution (LTE) system. For a cell edge user, a space frequency block code (SFBC) transmission mode is used to improve a signal-to-noise ratio at a cell edge. For a cell center user, a multi-layer parallel transmission mode is used to provide a relatively high data transmission rate. If a base station end can obtain all or some information of downlink channel, a precoding technology can be used to improve signal transmission quality or a signal transmission rate. For a time division duplex (TDD) system, because an uplink radio channel and a downlink radio channel have reciprocity, a precoding weighting vector of the downlink channel may be estimated based on the uplink channel. However, for a frequency division duplex (FDD) system, because carrier frequencies of an uplink channel and a downlink channel are different, a precoding weighting vector of the downlink channel cannot be obtained by using the uplink channel. In the LTE system, a precoding weighting matrix is usually obtained by using a precoding vector fed back by a terminal user. In a fifth-generation new radio access technology (NR), a type II codebook is defined, and a precoding matrix is $W=W_1 \times W_2$, where $W_1$ is a wideband feedback, wideband amplitude information $p_{r,l,m}^{(WB)}$ in $W_2$ is also a wideband feedback, and subband amplitude information $p_{r,l,m}^{(k)}$ and phase information $c_{r,l,m}^{(k)}$ in $W_2$ are subband feedbacks, where r=1, 2; l=1, 2; m=1, 2, or m=1, 2, 3, or m=1, 2, 3, 4. A quantity of quantized bits of $p_{r,l,m}^{(k)}$ and $c_{r,l,m}^{(k)}$ determines a size of channel state information reported by UE. When $W_2$ includes a relatively large quantity of subband coefficients and each subband coefficient requires a relatively large quantity of bits, overheads of uplink resources needed for feeding back $W_2$ are usually large.

In an existing solution, frequency domain compression is performed on coefficients in $W_2$, and a specific principle on which the frequency domain compression is based is as follows: For parameters on each resource block (RB), the parameters are consecutive on neighboring resource blocks, and phases are consecutive in terms of an entire bandwidth. Therefore, the parameters may be compressed in a frequency domain. A specific method includes the following steps. A vector is formed by using a phase on each RB. A Fourier transform operation is performed on the vector, and specifically, the Fourier transform operation may be an inverse discrete Fourier transformation (IDFT) or discrete Fourier transformation (DFT). Then, a coefficient with a relatively large value in a result obtained after the Fourier transform operation is quantized and fed back. Because the parameters are consecutive in the frequency domain, after the Fourier transform operation is performed for transformation, a quantity of coefficients with relatively large values is reduced. Therefore, a required feedback amount is also reduced, thereby reducing a quantity of bits.

In the existing solution, as shown in FIG. 1, when a sampling point is inaccurate, a result obtained after a Fourier transform operation has relatively severe energy dispersion. That is, there are a relatively large quantity of maximum values in values obtained after the Fourier transform. Therefore, uplink feedback overheads cannot be greatly reduced

SUMMARY

Embodiments of this application provide a channel feedback method and a related device, to reduce energy dispersion caused after a Fourier transform operation, reduce a quantity of coefficients that need to be reported, and reduce uplink resource overheads.

A first aspect of this application provides a channel feedback method, including: generating, by a terminal device, first information, where the first information includes parameters q, $m_1$, $m_2$, ..., $m_L$, and indication information of a vector V; q is an integer, and q<Q; Q is an integer, and Q>1; $0 \leq m_l \leq N-1$, and $1 \leq l \leq L$; L>1, N, L, and l are integers, and N is a quantity of subbands in a frequency domain bandwidth; the vector V includes L elements and satisfies $V=F_q \times C$, where C is a vector formed by N elements $c^1, \ldots, c^N$, $C=[c^1 \ c^2 \ \ldots \ c^N]^T$, $c^k$ is used to indicate channel state information on a $k^{th}$ frequency domain subband, $c^k$ is a complex number, a modulus of $c^k$ is $|c^k| \leq 1$, and $1 \leq k \leq N$; and an $l^{th}$ row vector in the matrix $F_q$ satisfies:

$$F_q(l) = \left[1 \ e^{j2\pi \frac{(m_l \times Q + q)}{N \times Q}} \ \ldots \ e^{j2\pi \frac{(m_l \times Q + q)}{N \times Q}(N-1)}\right]; \text{ or}$$

$$F_q(l) = \left[1 \ e^{-j2\pi \frac{(m_l \times Q + q)}{N \times Q}} \ \ldots \ e^{-j2\pi \frac{(m_l \times Q + q)}{N \times Q}(N-1)}\right];$$

and sending, by the terminal device, the first information to a network device. In this embodiment of this application, frequency domain compression is performed based on the vector C that reflects the channel state information, to obtain the vector V, and proper q and $m_l$ are selected, where l=1, 2, ..., L, so that energy dispersion caused after a Fourier transform operation is greatly reduced, thereby reducing a quantity of coefficients that need to be reported, and reducing uplink resource overheads.

In a possible design, in a first implementation of the first aspect of this embodiment of this application, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, where $W^k$ is the channel state information on the $k^{th}$ frequency domain subband; $W^k$ is a matrix with $N_l$ rows and R columns, $W_1$ is a matrix with $N_l$ rows and 2I columns, where $2I \geq R$, and $W_2$ is a matrix with 2I rows and R columns; and an element $W_2^k(i,j)$ in an $i^{th}$ row and $j^{th}$ column in $W_2^k$ satisfies $W_2^k(i,j) = p_{i,j} \times c_{i,j}^k$, where $p_{i,j}$ is a real number and $0 \leq p_{i,j} \leq 1$, $c_{i,j}^k$ is a complex number, and a modulus of $c_{i,j}^k$ satisfies $|c_{i,j}^k| \leq 1$; $1 \leq i \leq 2I$, $1 \leq j \leq R$, and $1 \leq k \leq N$; and $W_2^k$ includes $\{c_{1,1}^k \ c_{2,1}^k \ \ldots \ c_{2I,1}^k \ c_{1,2}^k \ \ldots \ c_{2I,R}^k\}$, where there are at least i and j that make $c^k = c_{i,j}^k$ true; and a vector corresponding to $c_{i,j}^1 \, c_{i,j}^2 \ldots c_{i,j}^N$ in $W_2^k$ is $V^{(i,j)}$. In this embodiment of this application, the channel state information includes wideband channel state information and subband channel state information, where reporting of the subband channel state information occupies a relatively large quantity of time-frequency resources. The subband channel state information in the channel state information is constructed by reporting q, $m_1, m_2, \ldots, m_L$, and the vector V in the first information, to reduce consumption of an uplink time-frequency resource.

In a possible design, in a second implementation of the first aspect of this embodiment of this application, $$W_1 = \begin{bmatrix} X_1 & 0 \\ 0 & X_1 \end{bmatrix},$$

$X_1$ is a matrix with $$\frac{N_t}{2}$$

rows and I columns, and $X_1 = [b_1 \, b_2 \ldots b_I]$, where a vector $b_i$ is a column vector including $$\frac{N_t}{2}$$

elements, vectors $b_i$ are mutually orthogonal, $1 \leq i \leq I$, and I is a positive integer greater than or equal to 1. In this embodiment of this application, $W_1$ is limited. In this structure, a quantity of elements in the matrix $W_2^k$ is usually less than a quantity of elements in the matrix $W^k$, so that a quantity of bits needed for reporting $W_2^k$ can be further reduced.

In a possible design, in a third implementation of the first aspect of this embodiment of this application, $p_{i,j}$ in elements in $i^{th}$ rows and $j^{th}$ columns of all matrices $W_2^k$ is the same. In this embodiment of this application, $p_{i,j}$ in the matrix is limited. In this limitation, a coefficient of $W_2^k$ is represented by a form of a wideband coefficient multiplied by a subband coefficient. A quantity of bits needed for reporting the wideband coefficient $p_{i,j}$ is relatively small. In addition, the method in this application is used to reduce a quantity of bits needed for reporting the subband coefficient, so that reporting of the wideband coefficient and reporting of the subband coefficient in $W_2^k$ are decoupled. This helps reduce a quantity of bits needed for reporting the vector V.

In a possible design, in a fourth implementation of the first aspect of this embodiment of this application, $W^k$ is a precoding matrix of a $k^{th}$ frequency domain subband. In this embodiment of this application, the matrix $W^k$ is limited, and an implementation of this application is specified.

In a possible design, in a fifth implementation of the first aspect of this embodiment of this application, $W^k$ is a frequency domain channel response of a $k^{th}$ frequency domain subband. In this embodiment of this application, the matrix $W^k$ is limited, and an implementation of this application is specified.

In a possible design, in a sixth implementation of the first aspect of this embodiment of this application, the first information includes indication information of R, and R is a rank of a channel matrix. In this embodiment of this application, because a quantity of elements in W is related to R, the terminal device needs to further report a value of R, to limit R in the matrix.

In a possible design, in a seventh implementation of the first aspect of this embodiment of this application, R is a quantity of receive antennas of the terminal. In this embodiment of this application, $W^k$ represents a frequency domain channel response, and a quantity of elements in $W^k$ is related to a quantity of transmit antenna ports of the network device and a quantity of receive antenna ports of the terminal device. Therefore, R is limited.

In a possible design, in an eighth implementation of the first aspect of this embodiment of this application, an $l^{th}$ element $V^{(i,j)}(l)$ in L elements of vector $V^{(i,j)}$ and a first sequence S satisfies $D_l^{(i,j)} = V^{(i,j)}(l) \times S$, and $D_l^{(i,j)}$ is the indication information of the vector V. In this embodiment of this application, a quantization loss caused by quantization of each element in $V^{(i,j)}$ is avoided.

In a possible design, in a ninth implementation of the first aspect of this embodiment of this application, an $l^{th}$ element in L elements in each vector $V^{(i,j)}$ is represented by using $n_l^{(i,j)}$ bits, where $1 \leq n_l^{(i,j)}$. In this embodiment of this application, quantization of elements in the matrix is limited, and another possible manner of reporting the vector V is provided.

In a possible design, in a tenth implementation of the first aspect of this embodiment of this application, there are at least $l_1, l_2, i_1, i_2, j_1, j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied. In this embodiment of this application, an element quantization manner in the matrix is limited. For example, when $i = i_1$, $j = j_1$, and an amplitude value of $p_{i,j}$ is relatively large, a subband coefficient $c_{i,j}^k$ corresponding to the amplitude value has a relatively great function in construction of the precoding matrix W. Therefore, for each element that is in $V^{(i,j)}$ and that corresponds to $p_{i,j}$ a relatively large quantity of quantized bits are used. However, when $i = i_2$, $j = j_2$, and a value of $p_{i,j}$ is relatively small, for each element that is in $V^{(i,j)}$ and that corresponds to the amplitude value, a relatively small quantity of quantized bits may be used. In this way, uplink feedback load can be further reduced.

In a possible design, in an eleventh implementation of the first aspect of this embodiment of this application, there are at least x and y that make $n_x^{(i,j)} \neq n_y^{(i,j)}$ true, where x is not equal to y. In this embodiment of this application, an element quantization manner in the matrix is limited. For example, corresponding to a pair of i and j, in elements in $V^{(i,j)}$, an element with a relatively large absolute value may be represented by using a relatively large quantity of quantized bits, while an element with a relatively small absolute value may be represented by using a relatively small quantity of quantized bits. In this way, uplink feedback load can be further reduced.

In a possible design, in a twelfth implementation of the first aspect of this embodiment of this application, there are at least $i_1, i_2, j_1, j_2$ that make a quantity of elements included in $V^{(i_1,j_1)}$ not equal to a quantity of elements included in $V^{(i_2,j_2)}$, where $i_1 \neq i_2$ or $j_1 \neq j_2$. In this embodiment of this application, a quantity of elements in the vector is limited. For example, the vector $V^{(i_1,j_1)}$ and the vector $V^{(i_2,j_2)}$ may include different quantities of elements, so that $V^{(i_1,j_1)}$ and $V^{(i_2,j_2)}$ may be indicated by using different load, thereby improving uplink feedback load utilization efficiency.

A second aspect of this application provides a channel feedback method, including: receiving, by the network device, first information from the terminal device, where the first information includes parameters q, $m_1, m_2, \ldots, m_L$, and indication information of a vector V; q is an integer, and $q<Q$; Q is an integer, and $Q>1$; $0 \leq m_l \leq N-1$, and $1 \leq l \leq L$; $L>1$, N, L, and l are integers, and N is a quantity of subbands in a frequency domain bandwidth; the vector V includes L elements and satisfies $V=F_q \times C$, where C is a vector formed by N elements $c^1, \ldots, c^N$, $C=[c^1 \ c^2 \ldots c^N]^T$, $c^k$ is used to indicate channel state information on a $k^{th}$ frequency domain subband, $c^k$ is a complex number, a modulus of $c^k$ is $|c^k| \leq 1$, and $1 \leq k \leq N$; and an $l^{th}$ row vector in the matrix $F_q$ satisfies:

$$F_q(l) = \left[1 \quad e^{j2\pi \frac{(m_l \times Q + q)}{N \times Q}} \ldots e^{j2\pi \frac{(m_l \times Q + q)}{N \times Q}(N-1)}\right]; \text{ or}$$

$$F_q(l) = \left[1 \quad e^{-j2\pi \frac{(m_l \times Q + q)}{N \times Q}} \ldots e^{-j2\pi \frac{(m_l \times Q + q)}{N \times Q}(N-1)}\right];$$

and obtaining, by the network device, channel state information based on the first information. In this embodiment of this application, the network device sends reference information to the terminal device, and receives the first information sent by the terminal device, where the first information includes the vector V, and the vector V is obtained by performing frequency domain compression based on the vector C that reflects the channel state information, and proper q and $m_l$ are selected, where $l=1, 2, \ldots, L$, so that energy dispersion caused after a Fourier transform operation is greatly reduced, thereby reducing a quantity of coefficients included in the first information received by the network device, and reducing uplink resource overheads.

In a possible design, in a first implementation of the second aspect of this embodiment of this application, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, where $W^k$ is the channel state information on the $k^{th}$ frequency domain subband; $W^k$ is a matrix with $N_t$ rows and R columns, $W_1$ is a matrix with $N_t$ rows and 2I columns, where $2I \geq R$, and $W_2^k$ is a matrix with 2I rows and R columns; and an element $W_2^k(i,j)$ in an $i^{th}$ row and $j^{th}$ column in $W_2^k$ satisfies $W_2^k(i,j) = p_{i,j} \times c_{i,j}^k$, where $p_{i,j}$ is a real number and $1 \leq p_{i,j} \leq 1$, $c_{i,j}^k$ is a complex number, and a modulus of $c_{i,j}^k$ satisfies $|c_{i,j}^k| \leq 1$; $1 \leq i \leq 2I$, $1 \leq j \leq R$, and $1 \leq k \leq N$; and $W_2^k$ includes $\{c_{1,1}^k \ c_{2,1}^k \ldots c_{2I,1}^k \ c_{1,2}^k \ldots c_{2I,R}^k\}$, where there are at least i and j that make $c^k = c_{i,j}^k$ true; and a vector corresponding to $c_{i,j}^1 \ c_{i,j}^2 \ldots c_{i,j}^N$ in $W_2^k$ is $V^{(i,j)}$. In this embodiment of this application, the channel state information includes wideband channel state information and subband channel state information, where reporting of the subband channel state information occupies a relatively large quantity of time-frequency resources. The subband channel state information in the channel state information is constructed by reporting q, $m_1, \ldots, m_L$, and the vector V in the first information, to reduce consumption of an uplink time-frequency resource.

In a possible design, in a second implementation of the second aspect of this embodiment of this application, $$W_1 = \begin{bmatrix} X_1 & 0 \\ 0 & X_1 \end{bmatrix},$$

$X_1$ is a matrix with $$\frac{N_t}{2}$$

rows and I columns, and $X_1 = [b_1 \ b_2 \ldots b_I]$, where a vector $b_i$ is a column vector including $$\frac{N_t}{2}$$

elements, vectors $b_i$ are mutually orthogonal, $1 \leq i \leq I$, and I is a positive integer greater than or equal to 1. In this embodiment of this application, $W_1$ is limited. In this structure, a quantity of elements in the matrix $W_2^k$ is usually less than a quantity of elements in the matrix $W^k$, so that a quantity of bits needed for reporting $W_2^k$ can be further reduced.

In a possible design, in a third implementation of the second aspect of this embodiment of this application, $p_{i,j}$ in elements in $i^{th}$ rows and $j^{th}$ columns of all matrices $W_2^k$ is the same. In this embodiment of this application, $p_{i,j}$ in the matrix is limited. In this limitation, a coefficient of $W_2^k$ is represented by form of a wideband coefficient multiplied by a subband coefficient. A quantity of bits needed for reporting the wideband coefficient $p_{i,j}$ is relatively small. In addition, the method in this application is used to reduce a quantity of bits needed for reporting the subband coefficient, so that reporting of the wideband coefficient and reporting of the subband coefficient in $W_2^k$ are decoupled. This helps reduce a quantity of bits needed for reporting the vector V.

In a possible design, in a fourth implementation of the second aspect of this embodiment of this application, $W^k$ is a precoding matrix of a $k^{th}$ frequency domain subband. In this embodiment of this application, the matrix $W^k$ is limited, and an implementation of this application is specified.

In a possible design, in a fifth implementation of the second aspect of this embodiment of this application, $W^k$ is a frequency domain channel response of a $k^{th}$ frequency domain subband. In this embodiment of this application, the matrix $W^k$ is limited, and an implementation of this application is specified.

In a possible design, in a sixth implementation of the second aspect of this embodiment of this application, the first information includes indication information of R, and R is a rank of a channel matrix. In this embodiment of this application, because a quantity of elements in W is related to R, the terminal device needs to further report a value of R, to limit R in the matrix.

In a possible design, in a seventh implementation of the second aspect of this embodiment of this application, R is a quantity of receive antennas of the terminal. In this embodiment of this application, $W^k$ represents a frequency domain channel response, and a quantity of elements in $W^k$ is related to a quantity of transmit antenna ports of the network device and a quantity of receive antenna ports of the terminal device. Therefore, R is limited.

In a possible design, in an eighth implementation of the second aspect of this embodiment of this application, an $l^{th}$ element $V^{(i,j)}(l)$ in L elements of vector $V^{(i,j)}$ and a first sequence S satisfies $D_l^{(i,j)} = V^{(i,j)}(l) \times S$, and $D_l^{(i,j)}$ is the indication information of the vector V. In this embodiment of this application, a quantization loss caused by quantization of each element in $V^{(i,j)}$ is avoided.

In a possible design, in a ninth implementation of the second aspect of this embodiment of this application, an $l^{th}$ element in L elements in each vector $V^{(i,j)}$ is represented by using $n_l^{(i,j)}$ bits, where $1 \le n_l^{(i,j)}$. In this embodiment of this application, quantization of elements in the matrix is limited, and another possible manner of reporting the vector V is provided.

In a possible design, in a tenth implementation of the second aspect of this embodiment of this application, there are at least $l_1$, $l_2$, $i_1$, $i_2$, $j_1$, $j_2$ that make $n_{l_1}^{(i_1,j_1)} \ne n_{l_2}^{(i_2,j_2)}$ true, where at least one of inequations $l_1 \ne l_2$, $i_1 \ne i_2$, and $j_1 \ne j_2$ is satisfied. In this embodiment of this application, an element quantization manner in the matrix is limited. For example, when $i=i_1$, $j=j_1$, and an amplitude value of $p_{i,j}$ is relatively large, a subband coefficient $c_{i,j}^k$ corresponding to the amplitude value has a relatively great function in construction of W in the precoding matrix. Therefore, for each element that is in $V^{(i,j)}$ and that corresponds to $p_{i,j}$, a relatively large quantity of quantized bits are used. However, when $i=i_2$, $j=j_2$, and a value of $p_{i,j}$ is relatively small, for each element that is in and that corresponds to the amplitude value, a relatively small quantity of quantized bits may be used. In this way, uplink feedback load can be further reduced.

In a possible design, in an eleventh implementation of the second aspect of this embodiment of this application, there are at least x, y that make $n_x^{(i,j)} \ne n_y^{(i,j)}$ true, where x is not equal to y. In this embodiment of this application, an element quantization manner in the matrix is limited. For example, corresponding to a pair of i and j, in an element in $V^{(i,j)}$, an element with a relatively large absolute value may be represented by using a relatively large quantity of quantized bits, while an element with a relatively small absolute value may be represented by using a relatively small quantity of quantized bits. In this way, uplink feedback load can be further reduced.

In a possible design, in a twelfth implementation of the second aspect of this embodiment of this application, there are at least $i_1$, $i_2$, $j_1$, $j_2$ that make a quantity of elements included in $V^{(i_1,j_1)}$ not equal to a quantity of elements included in $V^{(i_2,j_2)}$, where $i_1 \ne i_2$ or $j_1 \ne j_2$. In this embodiment of this application, a quantity of elements in the vector is limited. For example, the vector $V^{(i_1,j_1)}$ and the vector $V^{(i_2,j_2)}$ may include different quantities of elements, so that $V^{(i_1,j_1)}$ and $V^{(i_2,j_2)}$ may be indicated by using different load, thereby improving uplink feedback load utilization efficiency.

A third aspect of this application provides a terminal device, including a processing unit, configured to generate first information, where the first information includes parameters q, $m_1$, $m_2$, ..., $m_L$, and indication information of a vector V; q is an integer, and $q<Q$; Q is an integer, and $Q>1$, $0 \le m_l \le N-1$, and $1 \le l \le L$; $L>1$, N, L, and l are integers, and N is a quantity of subbands in a frequency domain bandwidth; the vector V includes L elements and satisfies $V = F_q \times C$ where C is a vector formed by N elements $c^1$, ..., $c^N$, $C = [c^1 \ c^2 \ ... \ c^N]^T$, $c^k$ is used to indicate channel state information on a $k^{th}$ frequency domain subband, $c^k$ is a complex number, a modulus of $c^k$ is $|c^k| \le 1$, and $1 \le k \le N$; and an $l^{th}$ row vector in the matrix $F_q$ satisfies:

$$F_q(l) = \left[ 1 \ e^{j2\pi \frac{(m_l \times Q + q)}{N \times Q}} \ ... \ e^{j2\pi \frac{(m_l \times Q + q)}{N \times Q}(N-1)} \right]; \text{ or}$$

$$F_q(l) = \left[ 1 \ e^{-j2\pi \frac{(m_l \times Q + q)}{N \times Q}} \ ... \ e^{-j2\pi \frac{(m_l \times Q + q)}{N \times Q}(N-1)} \right];$$

and a sending unit, configured to send the first information to a network device. In this embodiment of this application, frequency domain compression is performed based on the vector C that reflects the channel state information, to obtain the vector V, and proper q and $m_l$ are selected, where l=1, 2, ..., L, so that energy dispersion caused after a Fourier transform operation is greatly reduced, thereby reducing a quantity of coefficients that need to be reported, and reducing uplink resource overheads.

In a possible design, in a first implementation of the third aspect of this embodiment of this application, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, where $W^k$ is the channel state information on the $k^{th}$ frequency domain subband; $W^k$ is a matrix with $N_t$ rows and R columns, $W_1$ is a matrix with $N_t$ rows and 2I columns, where $2I \ge R$, and $W_2^k$ is a matrix with 2I rows and R columns; and an element $W_2^k(i,j)$ in $i^{th}$ row and $j^{th}$ column in $W_2^k$ satisfies $W_2^k(i,j) = p_{i,j} \times c_{i,j}^k$, where $p_{i,j}$ is a real number and $0 \le p_{i,j} \le 1$, $c_{i,j}^k$ is a complex number, and a modulus of $c_{i,j}^k$ satisfies $|c_{i,j}^k| \le 1$; $1 \le i \le 2I$, $1 \le j \le R$, and $1 \le k \le N$; and $W_2^k$ includes $\{c_{1,1}^k \ c_{2,1}^k \ ... \ c_{2I,1}^k \ c_{1,2}^k \ ... \ c_{2I,R}^k\}$, where there are at least i and j that make $c^k = c_{i,j}^k$ true; and a vector corresponding to $c_{i,j}^1 \ c_{i,j}^2 \ ... \ c_{i,j}^N$ in $W_2^k$ is $V^{(i,j)}$. In this embodiment of this application, the channel state information includes wideband channel state information and subband channel state information, where reporting of the subband channel state information occupies a relatively large quantity of time-frequency resources. The subband channel state information in the channel state information is constructed by reporting q, $m_1$, ..., $m_L$, and the vector V in the first information, to reduce consumption of an uplink time-frequency resource.

In a possible design, in a second implementation of the third aspect of this embodiment of this application, $$W_1 = \begin{bmatrix} X_1 & 0 \\ 0 & X_1 \end{bmatrix},$$

$X_1$ is a matrix with $$\frac{N_t}{2}$$

rows and I columns, and $X_1 = [b_1 \ b_2 \ ... \ b_I]$, where a vector $b_i$ is a column vector including $$\frac{N_t}{2}$$

elements, vectors $b_i$ are mutually orthogonal, $1 \le i \le I$, and I is a positive integer greater than or equal to 1. In this embodiment of this application, $W_1$ is limited. In this structure, a quantity of elements in the matrix $W_2^k$ is usually less than a quantity of elements in the matrix $W^k$, so that a quantity of bits needed for reporting $W_2^k$ can be further reduced.

In a possible design, in a third implementation of the third aspect of this embodiment of this application, $p_{i,j}$ in elements in $i^{th}$ rows and $j^{th}$ columns of all matrices $W_2^k$ is the same. In this embodiment of this application, $p_{i,j}$ in the matrix is limited. In this limitation, a coefficient of $W_2^k$ is represented by form of a wideband coefficient is multiplied by a subband coefficient. A quantity of bits needed for reporting the wideband coefficient $p_{i,j}$ is relatively small. In addition, the method in this application is used to reduce a quantity of bits needed for reporting the subband coefficient, so that reporting of the wideband coefficient and reporting of the subband coefficient in $W_2^k$ are decoupled. This helps reduce a quantity of bits needed for reporting the vector V.

In a possible design, in a fourth implementation of the third aspect of this embodiment of this application, $W^k$ is a precoding matrix of a $k^{th}$ frequency domain subband. In this embodiment of this application, the matrix $W^k$ is limited, and an implementation of this application is specified, to make this application more logical.

In a possible design, in a fifth implementation of the third aspect of this embodiment of this application, $W^k$ is a frequency domain channel response of a $k^{th}$ frequency domain subband. In this embodiment of this application, the matrix $W^k$ is limited, and an implementation of this application is specified.

In a possible design, in a sixth implementation of the third aspect of this embodiment of this application, the first information includes indication information of R, and R is a rank of a channel matrix. In this embodiment of this application, because a quantity of elements in W is related to R, the terminal device needs to further report a value of R, to limit R in the matrix.

In a possible design, in a seventh implementation of the third aspect of this embodiment of this application, R is a quantity of receive antennas of the terminal. In this embodiment of this application, $W^k$ represents a frequency domain channel response, and a quantity of elements in $W^k$ is related to a quantity of transmit antenna ports of the network device and a quantity of receive antenna ports of the terminal device. Therefore, R is limited.

In a possible design, in an eighth implementation of the third aspect of this embodiment of this application, an $l^{th}$ element $V^{(i,j)}(l)$ in L elements of vector $V^{(i,j)}$ and a first sequence satisfies $D_l^{(i,j)}=V^{(i,j)}(l)\times S$, and $D_l^{(i,j)}$ is the indication information of the vector V. In this embodiment of this application, a manner of processing the vector $V^{(i,j)}$ is provided. To be specific, each element in the vector $V^{(i,j)}$ is modulated onto a sequence, and the modulation sequence is sent to the network device. Therefore, a quantization loss caused by quantization of each element in $V^{(i,j)}$ is avoided.

In a possible design, in a ninth implementation of the third aspect of this embodiment of this application, an $l^{th}$ element in L elements in each vector $V^{(i,j)}$ is represented by using $n_l^{(i,j)}$ bits, where $1 \leq n_l^{(i,j)}$. In this embodiment of this application, quantization of elements in the matrix is limited, and another possible manner of reporting the vector V is provided.

In a possible design, in a tenth implementation of the third aspect of this embodiment of this application, there are at least $l_1, l_2, i_1, i_2, j_1, j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied. In this embodiment of this application, an element quantization manner in the matrix is limited. For example, when $i=i_1, j=j_1$, and an amplitude value of $p_{i,j}$ is relatively large, a subband coefficient $c_{i,j}^k$ corresponding to the amplitude value has a relatively great function in construction of W in the precoding matrix. Therefore, for each element that is in $V^{(i,j)}$ and that corresponds to $p_{i,j}$, a relatively large quantity of quantized bits are used. However, when $i=i_2, j=j_2$, and a value of $p_{i,j}$ is relatively small, for each element that is in $V^{(i,j)}$ and that corresponds to the amplitude value, a relatively small quantity of quantized bits may be used. In this way, uplink feedback load can be further reduced.

In a possible design, in an eleventh implementation of the third aspect of this embodiment of this application, there are at least x, y that make $n_x^{(i,j)} \neq n_y^{(i,j)}$ true, where x is not equal to y. In this embodiment of this application, an element quantization manner in the matrix is limited. For example, corresponding to a pair of i and j, in an element in $V^{(i,j)}$, an element with a relatively large absolute value may be represented by using a relatively large quantity of quantized bits, while an element with a relatively small absolute value may be represented by using a relatively small quantity of quantized bits. In this way, uplink feedback load can be further reduced.

In a possible design, in a twelfth implementation of the third aspect of this embodiment of this application, there are at least $i_1, i_2, j_1, j_2$ that make a quantity of elements included in $V^{(i_1,j_1)}$ not equal to a quantity of elements included in $V^{(i_2,j_2)}$, where $i_1 \neq i_2$ or $j_1 \neq j_2$. In this embodiment of this application, a quantity of elements in the vector is limited. For example, the vector $V^{(i_1,j_1)}$ and the vector $V^{(i_2,j_2)}$ may include different quantities of elements, so that $V^{(i_1,j_1)}$ and $V^{(i_2,j_2)}$ may be indicated by using different load, thereby improving uplink feedback load utilization efficiency.

A fourth aspect of this application provides a network device, including a receiving unit, configured to receive first information from a terminal device, where the first information includes parameters q, $m_1, m_2, \ldots, m_L$, and indication information of a vector V; q is an integer, and $q<Q$; Q is an integer, and $Q>1$; $0 \leq m_l \leq N-1$, and $1 \leq l \leq L$; $L>1$, N, L, and l are integers, and N is a quantity of subbands in a frequency domain bandwidth; the vector V includes L elements and satisfies $V=F_q \times C$, where C is a vector formed by N elements $c^1, \ldots, c^N$, $C=[c^1\ c^2\ \ldots\ c^N]^T$, $c^k$ is used to indicate channel state information on a $k^{th}$ frequency domain subband, $c^k$ is a complex number, a modulus of $c^k$ is $|c^k| \leq 1$, and $1 \leq k \leq N$; and an $l^{th}$ row vector in the matrix $F_q$ satisfies:

$$F_q(l) = \left[1\ \ e^{j2\pi \frac{(m_l \times Q+q)}{N \times Q}} \ \ \ldots\ \ e^{j2\pi \frac{(m_l \times Q+q)}{N \times Q}(N-1)}\right];\text{ or}$$

$$F_q(l) = \left[1\ \ e^{-j2\pi \frac{(m_l \times Q+q)}{N \times Q}} \ \ \ldots\ \ e^{-j2\pi \frac{(m_l \times Q+q)}{N \times Q}(N-1)}\right];$$

and a processing unit, configured to obtain channel state information based on the first information. In this embodiment of this application, the network device sends reference information to the terminal device, and receives the first information sent by the terminal device, where the first information includes the vector V, and the vector V is obtained by performing frequency domain compression based on the vector C that reflects the channel state information, and proper q and $m_1$ are selected, where $l=1, 2, \ldots, L$, so that energy dispersion caused after a Fourier transform operation is greatly reduced, thereby reducing a quantity of coefficients included in the first information received by the network device, and reducing uplink resource overheads.

In a possible design, in a first implementation of the fourth aspect of this embodiment of this application, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k=W_1 \times W_2^k$, where $W^k$ is the channel state information on the $k^{th}$ frequency domain subband; $W^k$ is a matrix with $N_t$ rows and R columns, $W_1$ is a matrix with $N_t$ rows and 2I columns, where $2I \geq R$, and $W_2^k$ is a matrix with 2I rows and R columns; and an element $W_2^k(i,j)$ in an $i^{th}$ row and $j^{th}$ column in $W_2^k$ satisfies $W_2^k(i,j)=p_{i,j} \times c_{i,j}^k$, where $p_{i,j}$ is a real number and $0 \leq p_{i,j} \leq 1$, $c_{i,j}^k$ is a complex number, and a modulus of $c_{i,j}^k$ satisfies $|c_{i,j}^k| \leq 1$; $1 \leq i \leq 2I$, $1 \leq j \leq R$, and $1 \leq k \leq N$; $W_2^k$ includes $\{c_{1,1}^k \ c_{2,1}^k \ \ldots \ c_{2I,1}^k \ c_{1,2}^k \ \ldots \ c_{2I,R}^k\}$, where there are at least i and j that make $c^k = c_{i,j}^k$ true; and a vector corresponding to $c_{i,j}^1 \ c_{i,j}^2 \ \ldots \ c_{i,j}^N$ in $W_2^k$ is $V^{(i,j)}$. In this embodiment of this application, the channel state information includes wideband channel state information and subband channel state information, where reporting of the subband channel state information occupies a relatively large quantity of time-frequency resources. The subband channel state information in the channel state information is constructed by reporting q, $m_1, \ldots, m_L$, and the vector V in the first information, to reduce consumption of an uplink time-frequency resource.

In a possible design, in a second implementation of the fourth aspect of this embodiment of this application, $$W_1 = \begin{bmatrix} X_1 & 0 \\ 0 & X_1 \end{bmatrix},$$

$X_1$ is a matrix with $$\frac{N_t}{2}$$

rows and I columns, and $X_1 = [b_1 \ b_2 \ \ldots \ b_I]$, where a vector $b_i$ is a column vector including $$\frac{N_t}{2}$$

elements, vectors $b_i$ are mutually orthogonal, $1 \leq i \leq I$, and I is a positive integer greater than or equal to 1. In this embodiment of this application, $W_1$ is limited. In this structure, a quantity of elements in the matrix $W_2^k$ is usually less than a quantity of elements in the matrix $W^k$, so that a quantity of bits needed for reporting $W_2^k$ can be further reduced.

In a possible design, in a third implementation of the fourth aspect of this embodiment of this application, $p_{i,j}$ in elements in $i^{th}$ rows and $j^{th}$ columns of all matrices $W_2^k$ is the same. In this embodiment of this application, $p_{i,j}$ in the matrix is limited. In this limitation, a coefficient of $W_2^k$ is represented by a form of a wideband coefficient is multiplied by a subband coefficient. A quantity of bits needed for reporting the wideband coefficient $p_{i,j}$ is relatively small. In addition, the method in this application is used to reduce a quantity of bits needed for reporting the subband coefficient, so that reporting of the wideband coefficient and reporting of the subband coefficient in $W_2^k$ are decoupled. This helps reduce a quantity of bits needed for reporting the vector V.

In a possible design, in a fourth implementation of the fourth aspect of this embodiment of this application, $W^k$ is a precoding matrix of a $k^{th}$ frequency domain subband. In this embodiment of this application, the matrix $W^k$ is limited, and an implementation of this application is specified.

In a possible design, in a fifth implementation of the fourth aspect of this embodiment of this application, $W^k$ is a frequency domain channel response of a $k^{th}$ frequency domain subband. In this embodiment of this application, the matrix $W^k$ is limited, and an implementation of this application is specified.

In a possible design, in a sixth implementation of the fourth aspect of this embodiment of this application, the first information includes indication information of R, and R is a rank of a channel matrix. In this embodiment of this application, because a quantity of elements in W is related to R, the terminal device needs to further report a value of R, to limit R in the matrix.

In a possible design, in a seventh implementation of the fourth aspect of this embodiment of this application, R is a quantity of receive antennas of the terminal. In this embodiment of this application, $W^k$ represents a frequency domain channel response, and a quantity of elements in $W^k$ is related to a quantity of transmit antenna ports of the network device and a quantity of receive antenna ports of the terminal device. Therefore, R is limited.

In a possible design, in an eighth implementation of the fourth aspect of this embodiment of this application, an $l^{th}$ element $V^{(i,j)}(l)$ in L elements of vector $V^{(i,j)}$ and a first sequence S satisfies $D_l^{(i,j)} = V^{(i,j)}(l) \times S$, and $D_l^{(i,j)}$ is the indication information of the vector V. In this embodiment of this application, a quantization loss caused by quantization of each element in $V^{(i,j)}$ is avoided.

In a possible design, in a ninth implementation of the fourth aspect of this embodiment of this application, an $l^{th}$ element in L elements in each vector $V^{(i,j)}$ is represented by using $n_l^{(i,j)}$ bits, wherein $1 \leq n_l^{(i,j)}$. In this embodiment of this application, quantization of elements in the matrix is limited, and another possible manner of reporting the vector V is provided.

In a possible design, in a tenth implementation of the fourth aspect of this embodiment of this application, there are at least $l_1, l_2, i_1, i_2, j_1, j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied. In this embodiment of this application, an element quantization manner in the matrix is limited. For example, when $i=i_1$, $j=j_1$, and an amplitude value of $p_{i,j}$ is relatively large, a subband coefficient $c_{i,j}^k$ corresponding to the amplitude value has a relatively great function in construction of W in the precoding matrix. Therefore, for each element that is in $V^{(i,j)}$ and that corresponds to $p_{i,j}$ a relatively large quantity of quantized bits are used. However, when $i=i_2$, $j=j_2$, and a value of $p_{i,j}$ is relatively small, for each element that is in $V^{(i,j)}$ and that corresponds to the amplitude value, a relatively small quantity of quantized bits may be used. In this way, uplink feedback load can be further reduced.

In a possible design, in an eleventh implementation of the fourth aspect of this embodiment of this application, there are at least x, y that make $n_x^{(i,j)} \neq n_y^{(i,j)}$ true, where x is not equal to y. In this embodiment of this application, an element quantization manner in the matrix is limited. For example, corresponding to a pair of i and j, in an element in $V^{(i,j)}$, an element with a relatively large absolute value may be represented by using a relatively large quantity of quantized bits, while an element with a relatively small absolute value may be represented by using a relatively small quantity of quantized bits. In this way, uplink feedback load can be further reduced.

In a possible design, in a twelfth implementation of the fourth aspect of this embodiment of this application, there are at least $i_1, i_2, j_1, j_2$ that make a quantity of elements included in $V^{(i_1,j_1)}$ not equal to a quantity of elements included in $V^{(i_2,j_2)}$, where $i_1 \neq i_2$ or $j_1 \neq j_2$. In this embodiment of this application, a quantity of elements in the vector is limited. For example, the vector $V^{(i_1,j_1)}$ and the vector $V^{(i_2,j_2)}$ may include different quantities of elements, so that $V^{(i_1,j_1)}$ and $V^{(i_2,j_2)}$ may be indicated by using different load, thereby improving uplink feedback load utilization efficiency.

A fifth aspect of this application provides a computer-readable storage medium. The computer-readable storage medium stores an instruction, and when the instruction is run on a computer, the computer is enabled to perform the method in the foregoing aspects.

A sixth aspect of this application provides a computer program product including an instruction. When the computer program product is run on a computer, the computer is enabled to perform the method in the foregoing aspects.

A seventh aspect of this application provides a chip. The chip includes an input interface, an output interface, at least one processor, and at least one memory, the at least one memory is configured to store code, the at least one processor is configured to execute the code in the memory, and when the code is executed, the chip is configured to perform the methods in the foregoing aspects.

An eighth aspect of this application provides a chip system. The chip system includes a processor, configured to support a terminal device and a network device in implementing functions in the foregoing aspects, for example, sending or processing data and/or information in the foregoing method. In a possible design, the chip system further includes a memory. The memory is configured to store a program instruction and data that are necessary for the terminal device or the network device. The chip system may include a chip, or may include a chip and another discrete device.

A ninth aspect of this application further provides a communications system, including the terminal device and the network device in the foregoing aspects, and the terminal device and the network device in the communications system are configured to perform the method in the foregoing aspects.

DETAILED DESCRIPTION OF ILLUSTRATIVE EMBODIMENTS

Embodiments of this application provide a channel feedback method and a related device, to reduce energy dispersion caused after a Fourier transform operation, reduce a quantity of coefficients that need to be reported, and reduce uplink resource overheads.

To make a person skilled in the art understand the solutions in this application better, the following describes the embodiments of this application with reference to the accompanying drawings in the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. In addition, the terms "include", "have" or any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 1:
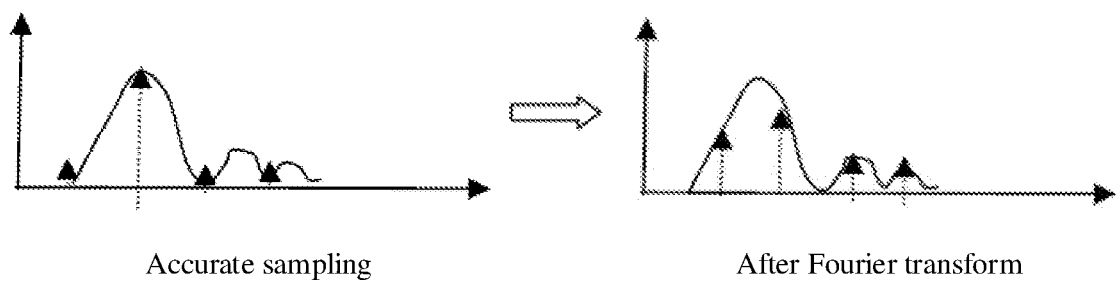
FIG. 1 is a schematic diagram of energy dispersion caused after a Fourier transform is performed on a vector in an existing solution.
Figure 2:
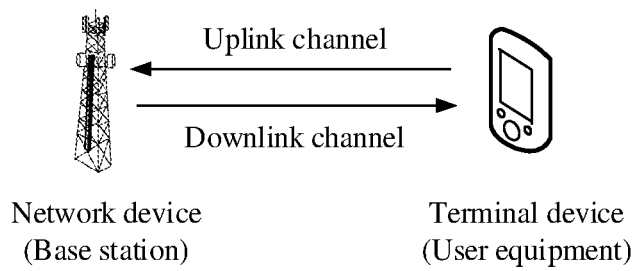
FIG. 2 is a schematic diagram of a network architecture to which an embodiment of this application is applied.

The embodiments of this application may be applied to a network architecture shown in FIG. 2. In the network architecture, a signal is transmitted between a network device (base station) and a terminal device (mobile phone). A device sending a reference signal in this application is referred to as a network device. In the embodiments of this application, an example in which the network device sends the reference signal to the terminal device is used for description. When the network device sends the reference signal to the terminal device by using a downlink channel, the terminal device determines, based on the reference signal, first information that needs to be reported, where the first information is used to indicate state information of the downlink channel, and sends the first information to the network device by using an uplink channel.

Figure 3:
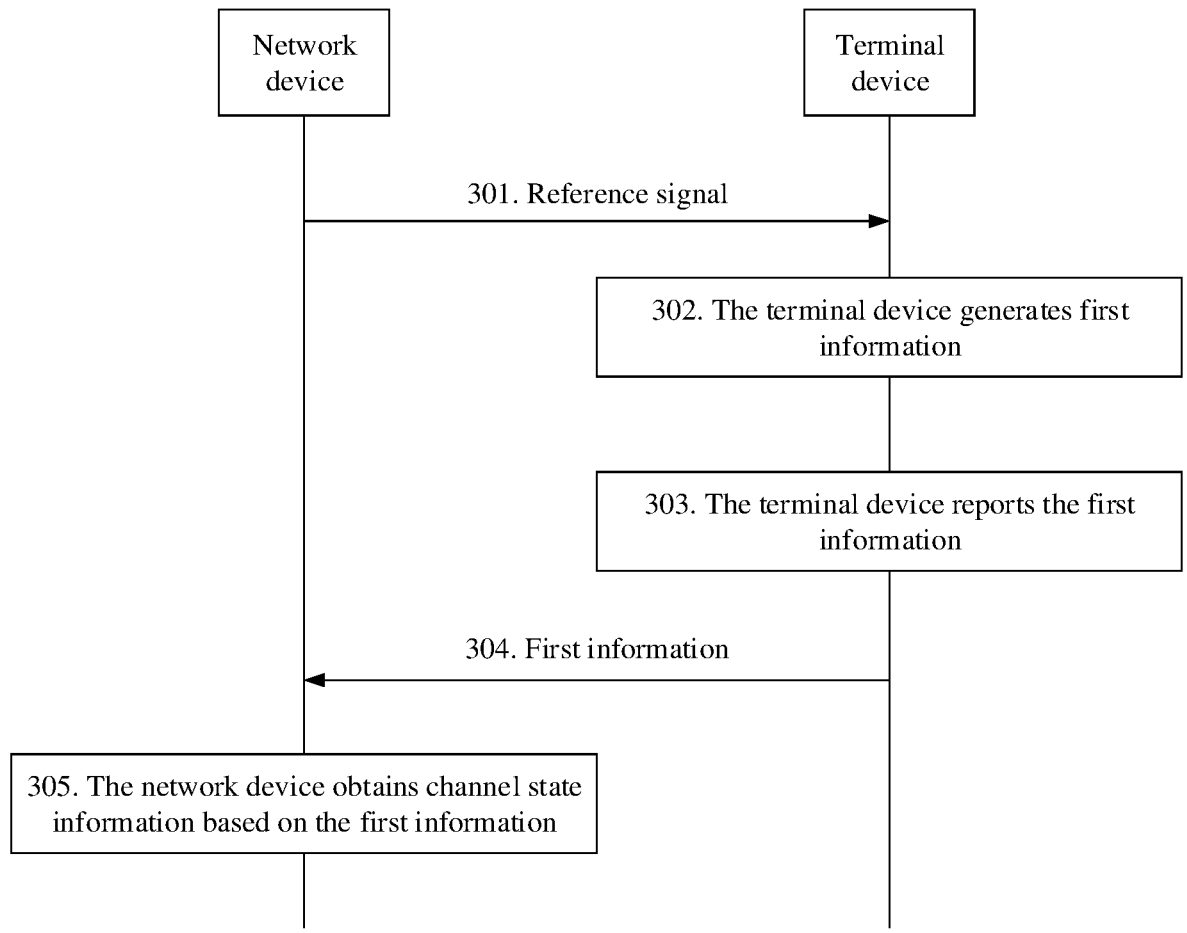
FIG. 3 is a schematic diagram of an embodiment of a channel feedback method according to an embodiment of this application.

For ease of understanding, the following describes a specific procedure in the embodiments of this application. Referring to FIG. 3, an embodiment of a channel feedback method according to an embodiment of this application includes the following steps.

301. A network device sends a reference signal to a terminal device.

The network device sends the reference signal to the terminal device, the reference signal is used to determine first information, and the first information is used to indicate channel state information.

For example, the network device sends a preset reference signal to the terminal device, the reference signal is a channel state information-reference signal (channel state information-reference signal, CSI-RS), the CSI-RS is used to measure state information of a first channel, and the first channel is a downlink channel.

It should be noted that the network device may select, based on an actual situation, different manners to transmit the reference signal. The CSI-RS is transmitted during any quantity of symbol periods in each CSI-RS subframe. The CSI-RS may be sent based on different periods. For example, CSI-RSs are transmitted every two or ten subframes. Alternatively, CSI-RSs may be transmitted at an interval of another quantity of subframes. This is not specifically limited herein.

302. The terminal device generates first information.

The terminal device generates the first information, and the first information includes parameters $q, m_1, m_2, \ldots, m_L$, and indication information of a vector V. The vector V includes L elements and satisfies $V=F_q \times C$, where C is a vector formed by N elements $c^1, \ldots, c^N$, $C=[c^1\ c^2\ \ldots\ c^N]^T$, $c^k$ is used to represent channel state information on a $k^{th}$ frequency domain subband, $c^k$ is a complex number, a modulus $c^k$ is $|c^k| \le 1$, and $1 \le k \le N$; and an $l^{th}$ row vector in the matrix satisfies:

$$F_q(l) = \left[ 1\ e^{j2\pi \frac{(m_l \times Q + q)}{N \times Q}} \ \ldots\ e^{j2\pi \frac{(m_l \times Q + q)}{N \times Q}(N-1)} \right];\ \text{or}$$

$$F_q(l) = \left[ 1\ e^{-j2\pi \frac{(m_l \times Q + q)}{N \times Q}} \ \ldots\ e^{-j2\pi \frac{(m_l \times Q + q)}{N \times Q}(N-1)} \right];$$

where q is an integer, and q<Q; Q is an integer, and Q>1; $0 \le m_l \le N-1$, and $1 \le l \le L$; and L>1, N, L, and l are integers, and N is a quantity of subbands in a frequency domain bandwidth.

In a feasible implementation, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, where $W^k$ is the channel state information on the $k^{th}$ frequency domain subband;

$W^k$ is a matrix with $N_t$ rows and R columns, $W_1$ is a matrix with $N_t$ rows and 2I columns, where $2I \ge R$, and $W_2^k$ is a matrix with 2I rows and R columns; an element $W_2^k(i,j)$ in an $i^{th}$ row and a $j^{th}$ column in $W_2^k$ satisfies $W_2^k(i,j) = p_{i,j} \times c_{i,j}^k$, where $p_{i,j}$ is a real number and $0 \le p_{i,j} \le 1$, $c_{i,j}^k$ is a complex number, and a modulus of $c_{i,j}^k$ satisfies $|c_{i,j}^k| \le 1$; and $1 \le i \le 2I$, $1 \le j \le R$, and $1 \le k \le N$; and $W_2^k$ includes $\{c_{1,1}^k\ c_{2,1}^k\ \ldots\ c_{2I,1}^k\ c_{1,2}^k\ \ldots\ c_{2I,R}^k\}$, where there are at least i and j that make $c^k = c_{i,j}^k$ true; and a vector corresponding to $c_{i,j}^1\ c_{i,j}^2\ \ldots\ c_{i,j}^N$ in $W_2^k$ is $V^{(i,j)}$.

For example, the $k^{th}$ element $c^k$ of the vector C is a product factor of an element in an $i^{th}$ row and a $j^{th}$ column of the second matrix, $W_2^k$ is the second matrix of the $k^{th}$ frequency domain subband, and the second matrix $W_2^k$ and the first matrix $W_1$ satisfy: $W^k = W_1 \times W_2^k$, where $W^k$ is the channel state information on the $k^{th}$ frequency domain subband; and an element $W_2^k(i,j)$ in an $i^{th}$ row and a $j^{th}$ column in $W_2^k$ satisfies $W_2^k(i,j) = p_{i,j} \times c_{i,j}^k$, where $p_{i,j}$ is a real number and $0 \le p_{i,j} \le 1$, $c_{i,j}^k$ is a complex number, and a modulus of $c_{i,j}^k$ satisfies $|c_{i,j}^k| \le 1$; and $1 \le i \le 2I$, $1 \le j \le R$, and $1 \le k \le N$.

In an example, $W_1$ has the following form:

$$W_1 = \begin{bmatrix} X_1 & 0 \\ 0 & X_1 \end{bmatrix},$$

where $X_1$ is a matrix with $$\frac{N_t}{2}$$

rows and I columns, and $X_1 = [b_1\ b_2\ \ldots\ b_I]$, where a vector $b_i$ is a column vector including $$\frac{N_t}{2}$$

elements, vectors $b_i$ are mutually orthogonal, $1 \le i \le I$, and I is a positive integer greater than or equal to 1. In this example, $W_1$ is limited. In this structure, a quantity of elements in the matrix $W_2^k$ is usually less than a quantity of elements in the matrix $W^k$, so that a quantity of bits needed for reporting $W_2^k$ can be further reduced.

In this example, $p_{i,j}$ in elements in $i^{th}$ rows and $j^{th}$ columns of all matrices $W_2^k$ is the same. In an example, $p_{i,j}$ in the matrix is limited. In this limitation, a coefficient of $W_2^k$ is represented by a form of a wideband coefficient is multiplied by a subband coefficient. A quantity of bits needed for reporting the wideband coefficient $p_{i,j}$ is relatively small. However, the method in this application is used to reduce a quantity of bits needed for reporting the subband coefficient, so that reporting of the wideband coefficient and reporting of the subband coefficient in $W_2^k$ are decoupled. This helps reduce a quantity of bits needed for reporting the vector V.

In an example, $W^k$ is a precoding matrix of a $k^{th}$ frequency domain subband.

In an example, the first information includes indication information of R, and R is a rank of a channel matrix. In this example, because a quantity of elements in W is related to R, the terminal device needs to further report a value of R, to limit R in the matrix.

It should be noted that, $W_2^k$ may also be in another form, and an element in an $i^{th}$ row and a $j^{th}$ column in $W_2^k$ may be represented as $W_2^k(i,j) = p_{r,l,m}^{(WB)} \times p_{r,l,m}^{(k)} \times c_{r,l,m}^{(k)}$, where $p_{r,l,m}^{(WB)}$ represents wideband amplitude information, $p_{r,l,m}^{(k)}$ represents subband amplitude information, and $c_{r,l,m}^{(k)}$ represents phase information. Specifically, $p_{r,l,m}^{(k)} \in \{1, \sqrt{0.5}\}$, $p_{r,l,m}^{(WB)} \in \{1, \sqrt{0.5}, \sqrt{0.25}, \sqrt{0.125}, \sqrt{0.0625}, \sqrt{0.0313}, \sqrt{0.0156}, 0\}$, $$c_{r,l,m}^{(k)} \in \{e^{j\frac{\pi}{2}}, n = 0, 1, 2, 3\}, \text{ or}$$

$$c_{r,l,m}^{(k)} \in \{e^{j\frac{\pi}{4}}, n = 0, 1, 2, 3, 4, 5, 6, 7\},$$

where r represents an index of an antenna polarization direction dimension, l represents a sequence number of a data layer, and m represents a sequence number of a column vector of a diagonal block matrix $X_1$ in $W_1$.

For example, in a case of RANK1, when antenna polarization direction dimensions are 0 and 1, $W_2^k$ has the following form:

$$W_2^k = \begin{bmatrix} p_{0,0,0}^{(WB)} \cdot p_{0,0,0}^{(k)} \cdot c_{0,0,0}^{(k)} \\ p_{0,0,1}^{(WB)} \cdot p_{0,0,1}^{(k)} \cdot c_{0,0,1}^{(k)} \\ \vdots \\ p_{0,0,I-1}^{(WB)} \cdot p_{0,0,I-1}^{(k)} \cdot c_{0,0,I-1}^{(k)} \\ p_{1,0,0}^{(WB)} \cdot p_{1,0,0}^{(k)} \cdot c_{1,0,0}^{(k)} \\ p_{1,0,1}^{(WB)} \cdot p_{1,0,1}^{(k)} \cdot c_{1,0,1}^{(k)} \\ \vdots \\ p_{1,0,I-1}^{(WB)} \cdot p_{1,0,I-1}^{(k)} \cdot c_{1,0,I-1}^{(k)} \end{bmatrix}$$

and in a case of RANK2, when the antenna polarization direction dimensions are 0 and 1, $W_2^k$ has the following form:

$$W_2^k = \begin{bmatrix} p_{0,0,0}^{(WB)} \cdot p_{0,0,0}^{(k)} \cdot c_{0,0,0}^{(k)} & p_{0,1,0}^{(WB)} \cdot p_{0,1,0}^{(k)} \cdot c_{0,1,0}^{(k)} \\ p_{0,0,1}^{(WB)} \cdot p_{0,0,1}^{(k)} \cdot c_{0,0,1}^{(k)} & p_{0,1,1}^{(WB)} \cdot p_{0,1,1}^{(k)} \cdot c_{0,1,1}^{(k)} \\ \vdots & \vdots \\ p_{0,0,I-1}^{(WB)} \cdot p_{0,0,I-1}^{(k)} \cdot c_{0,0,I-1}^{(k)} & p_{0,1,I-1}^{(WB)} \cdot p_{0,1,I-1}^{(k)} \cdot c_{0,1,I-1}^{(k)} \\ p_{1,0,0}^{(WB)} \cdot p_{1,0,0}^{(k)} \cdot c_{1,0,0}^{(k)} & p_{1,1,0}^{(WB)} \cdot p_{1,1,0}^{(k)} \cdot c_{1,1,0}^{(k)} \\ p_{1,0,1}^{(WB)} \cdot p_{1,0,1}^{(k)} \cdot c_{1,0,1}^{(k)} & p_{1,1,1}^{(WB)} \cdot p_{1,1,1}^{(k)} \cdot c_{1,1,1}^{(k)} \\ \vdots & \vdots \\ p_{1,0,I-1}^{(WB)} \cdot p_{1,0,I-1}^{(k)} \cdot c_{1,0,I-1}^{(k)} & p_{1,1,I-1}^{(WB)} \cdot p_{1,1,I-1}^{(k)} \cdot c_{1,1,I-1}^{(k)} \end{bmatrix}$$

In an example, $W^k$ is a frequency domain channel response of a $k^{th}$ frequency domain subband.

In this example, j=1, i=2r+m, and $p_{r,l,m}^{(WB)}$ corresponds to $p_{i,j}$ in the claims, and $p_{r,l,m}^{(k)} \times c_{r,l,m}^{(k)}$ corresponds to $c_{i,j}^k$ in the claims.

In an example, R is a quantity of receive antennas of the terminal.

It may be understood that the terminal device performs frequency domain compression on the vector C in a plurality of implementations. For example, in a process of performing frequency domain compression on the vector C, an over-sampled inverse discrete Fourier transform (inverse discrete fourier transform, IDFT) or discrete Fourier transform (discrete fourier transform, DFT) method is used. Using the inverse discrete Fourier transform as an example, assuming that an over-sampling factor is Q, a specific implementation process of the inverse discrete Fourier transform includes: That q=0, 1, . . . , Q−1 is used to construct a DFT matrix $F_q'$, where an $l^{th}$ row vector in the matrix $F_q'$ satisfies:

$$F_q'(l) = \begin{bmatrix} 1 & e^{j2\pi \frac{l \times Q+q}{NQ}} & \cdots & e^{j2\pi \frac{l \times Q+q}{NQ}(N-1)} \end{bmatrix};$$

the matrix $F_q'$ is multiplied by the vector C, to obtain a vector $U_q$, that is, $U_q = F_q'C$. L elements with relatively great energy or amplitude in the vector $U_q$ are used and denoted as $V_q = [U_q(m_1) \ U_q(m_2) \ \ldots \ U_q(m_L)]^T$, where $U_q(m_1)$ represents an $m_1^{th}$ element in the vector $U_q$. The terminal device traverses all values of q to obtain Q vectors $V_0$, $V_1$, . . . , $V_{Q−1}$. A vector $V_q$ is selected from the Q vectors, and factors q, $m_1$, $m_2$, . . . , $m_{L−1}$ corresponding to the vector $V_q$ are determined, where a principle for selecting the vector $V_q$ includes but is not limited to enabling a sum of energy of L elements in $V_q$ to be greatest.

For another example, (N(Q−1)) zeros are padded at the end of the vector C to form C'. In this case, C' is a column vector of (NQ×1). The IDFT is performed on C' by NQ elements, where C"=IDFT(C'). In C", a $(q+1)^{th}$ element is used as a start point, and N elements are taken at an interval of Q, to form $C^{(q)'}$, that is $C^{(q)'}$=C"(q+1:Q:NQ). $V_q$ is determined in $C^{(q)'}$ by using the same principle, and the factors q, $m_1$, $m_2$, . . . , $m_{L−1}$ corresponding to the vector $V_q$ are determined. Alternatively, there may be another implementation, and this is not specifically limited herein. It may be understood that, for $V_q$ that is obtained when q is set to different values, when q, $m_1$, $m_2$, . . . , $m_L$ are determined, the vector $V_q$ is also determined, that is, $V_q$ is the vector V.

303. The terminal device reports the first information.

The terminal device generates the first information, and the first information includes the parameters q, $m_1$, $m_2$, . . . , $m_L$, and the indication information of the vector V.

Specifically, the terminal device may report the vector V in two different manners: quantization reporting and analog reporting. For example, when the terminal device performs analog reporting processing on the vector V, the terminal device multiplies an $l^{th}$ element V(l) in the L elements of the vector V by a first sequence S, that is, D(l)=V(l)×S, where the first sequence S is separately $S^1$, $S^2$, . . . $S^L$, and D(l) is indication information of the $l^{th}$ element in the vector V. When the terminal device performs quantization reporting processing on the vector V, the terminal device separately quantizes an amplitude and a phase in the vector V.

304. The terminal device sends the first information to the network device.

The terminal device sends the first information to the network device, where the first information includes the factor q, indexes $m_1$, $m_2$, . . . , $m_L$ of L row vectors that form the matrix $F_q$, and the indication information of the vector V, and the indication information is used to determine the L elements in the vector V.

In an implementation, a kth element in the vector C is from a matrix $W_2^k$, where the matrix $W_2^k$ is a matrix with 2I rows and R columns, and an element in an ith row and a jth column is $W_2^k(i,j)=p_{i,j}c_{i,j}^k$. An implementation is that the kth element in the vector C may be any element from the matrix $W_2^k$, for example, $c^k=c_{i,j}^k$, 1≤i≤2I, and 1≤j≤R. A vector formed by $c_{i,j}^1$, $c_{i,j}^2$, . . . , $c_{i,j}^k$ may be denoted as $C^{(i,j)}$, and a vector V corresponding to the vector $C^{(i,j)}$ is denoted as $V^{(i,j)}$.

It may be understood that for different pairs of i and j, quantities of obtained sampling points of maximum values after the IDFT is performed on the vector C may be different.

It should be noted that in NR, an element in the matrix $W_2^k$ may be represented as $W_2^k=P_{r,l,m}^{(WB)} \times P_{r,l,m}^{(k)} \times c_{r,l,m}^{(k)}$.

In an example, each element in L elements in each vector $V^{(i,j)}$ is represented by using $n_l^{(i,j)}$ bits, where $1 \leq n_l^{(i,j)}$.

In an example, there are at least $l_1$, $l_2$, $i_1$, $i_2$, $j_1$, $j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied. In an example, an element quantization manner in the matrix is limited. For example, when i=$i_1$, j=$j_1$, and an amplitude value of $p_{i,j}$ is relatively large, a subband coefficient $c_{i,j}^k$ corresponding to the amplitude value has a relatively great function in construction of W in the precoding matrix. Therefore, for each element that is in $V^{(i,j)}$ and that corresponds to $p_{i,j}$, a relatively large quantity of quantized bits are used. However, when i=$i_2$, j=$j_2$, and a value of $p_{i,j}$ is relatively small, for each element that is in $V^{(i,j)}$ and that corresponds to the amplitude value, a relatively small quantity of quantized bits may be used. In this way, uplink feedback load can be further reduced.

In an example, there are at least x and y that make $n_x^{(i,j)} \neq n_y^{(i,j)}$ true, where x is not equal to y. In an example, an element quantization manner in the matrix is limited. For example, corresponding to a pair of i and j, in an element in $V^{(i,j)}$, an element with a relatively large absolute value may be represented by using a relatively large quantity of quantized bits, while an element with a relatively small absolute value may be represented by using a relatively small quantity of quantized bits. In this way, uplink feedback load can be further reduced.

In an example, there are at least $i_1$, $i_2$, $j_1$, $j_2$ that make a quantity of elements included in $V^{(i_1,j_1)}$ not equal to a quantity of elements included in $V^{(i_2,j_2)}$, where $i_1 \neq i_2$ or $j_1 \neq j_2$. In an example, the quantity of elements in the vector is limited. For example, the vector $V^{(i_1,j_1)}$ and the vector $V^{(i_2,j_2)}$ may include different quantities of elements, so that $V^{(i_1,j_1)}$ and $V^{(i_2,j_2)}$ may be indicated by using different load, thereby improving uplink feedback load utilization efficiency.

It should be noted that the terminal device may alternatively directly feed back a channel H or a related matrix R of a channel H to the network device, where the channel H is estimated by the terminal device. For example, the channel H may be represented as H=W$_1$×W$_2$, where representation forms of W$_1$ and W$_2$ are similar to those in a Type II codebook. H is a matrix of N$_t$×N$_r$, W$_1$ is a matrix of N$_t$×2I, and W$_2$ is a matrix of 2I×N$_r$. The related matrix R of the channel may be represented as R=(W$_1$×W$_2$)×(W$_1$×W$_2$)$^H$.

305. The network device obtains channel state information based on the first information.

The network device obtains the channel state information based on the first information. After receiving the first information, the network device extracts the channel state information from the first information.

For example, when the terminal device reports the vector V in an analog reporting manner, a received signal corresponding to an $l^{th}$ element of V is: y=h×V(l)×S$^l$+n, where 1≤l≤L, S$^l$ is a signal known to the network device, and a radio channel response h may be obtained through channel estimation. The network device may extract the $l^{th}$ element of the vector V by using some general algorithms. Using a maximum likelihood related algorithm as an example, the network device extracts a needed signal by using $\hat{V}(l)=(\hat{h}\times S^l)\otimes y$, where $\hat{h}$ is an estimation value of a channel h, and $\hat{V}(l)$ is an estimation value of an $l^{th}$ element of the vector V.

It may be understood that, when an element carried in V is used to determine an element in an $i^{th}$ row and a $j^{th}$ column in the second matrix W$_2$ on each frequency domain subband, the vector V may be represented as V$^{(i,j)}$.

It should be noted that amplitudes and phases corresponding to a different pair of i and j may have different quantized bits or amplitudes and phases corresponding to different r, l, and m may have different quantized bits. For example, for some r, l, and m, $p_{r,l,m}^{(k)}$ corresponding to r, l, and m is relatively large. After the IDFT transform, more bits can be used to quantize an amplitude and a phase of a result that is obtained after the IDFT. For example, for some r, l, and m, $p_{r,l,m}^{(k)}$ corresponding to these r, l, and m is relatively small. After the IDFT transform, fewer bits can be used to quantize an amplitude and a phase of a result that is obtained after the IDFT.

It may be understood that, even if different M values are included in a same vector V, different quantized bits may also be used. For example, for a larger value in the M values, more bits are used to quantize the amplitude and the phase, while for a smaller value in the M values, fewer bits are used to quantize the amplitude and the phase.

In this embodiment of this application, frequency domain compression is performed based on the vector C that reflects the channel state information, to obtain the vector V, and proper q and m$_l$ are selected, where l=1, 2, . . . , L, so that energy dispersion caused after a Fourier transform operation is greatly reduced, thereby reducing a quantity of coefficients that need to be reported, and reducing uplink resource overheads.

Figure 4:
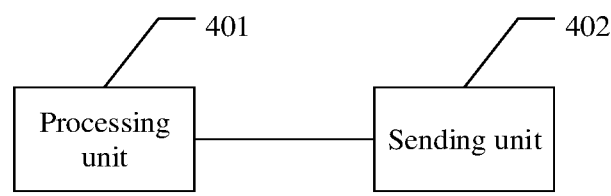
FIG. 4 is a schematic diagram of an embodiment of a terminal device according to an embodiment of this application.

The foregoing describes the channel feedback method in this embodiment of this application, and the following describes the network device and the terminal device in the embodiments of this application. Referring to FIG. 4, an embodiment of a terminal device according to an embodiment of this application includes: a processing unit 401, configured to generate first information, where the first information includes parameters q, m$_1$, m$_2$, . . . , m$_L$, and indication information of a vector V; q is an integer, and q<Q; Q is an integer, and Q>1; 0≤m$_l$≤N−1, and 1≤l≤L; L>1, N, L, and l are integers, and N is a quantity of subbands in a frequency domain bandwidth; the vector V includes L elements and satisfies V=F$_q$×C, where C is a vector formed by N elements c$^1$, . . . , c$^N$, C=[c$^1$ c$^2$ . . . c$^N$]$^T$, c$^k$ is used to indicate channel state information on a $k^{th}$ frequency domain subband, c$^k$ is a complex number, a modulus of c$^k$ is |c$^k$|≤1, and 1≤k≤N; and an $l^{th}$ row vector in the matrix F$_q$ satisfies:

$$F_q(l) = \left[1 \;\; e^{j2\pi\frac{(m_l\times Q+q)}{N\times Q}} \;\; \ldots \;\; e^{j2\pi\frac{(m_l\times Q+q)}{N\times Q}(N-1)}\right]; \text{ or}$$

$$F_q(l) = \left[1 \;\; e^{-j2\pi\frac{(m_l\times Q+q)}{N\times Q}} \;\; \ldots \;\; e^{-j2\pi\frac{(m_l\times Q+q)}{N\times Q}(N-1)}\right];$$

and a sending unit 402, configured to send the first information to a network device.

In an example, a $k^{th}$ element c$^k$ of the vector C is included in an element in an $i^{th}$ row and a $j^{th}$ column of a second matrix W$_2^k$ of the $k^{th}$ frequency domain subband, and the second matrix W$_2^k$ and a first matrix W$_1$ satisfy: W$^k$=W$_1$×W$_2^k$, where W$^k$ is the channel state information on the $k^{th}$ frequency domain subband;

W$^k$ is a matrix with N$_t$ rows and R columns, W$_1$ is a matrix with N$_t$ rows and 2I columns, where 2I≥R, and W$_2^k$ is a matrix with 2I rows and R columns; an element W$_2^k$(i,j) in an $i^{th}$ row and a $j^{th}$ column in W$_2^k$ satisfies W$_2^k$(i,j)=p$_{i,j}$×c$_{i,j}^k$, where p$_{i,j}$ is a real number and 0≤p$_{i,j}$≤1, c$_{i,j}^k$ is a complex number, and a modulus of c$_{i,j}^k$ satisfies |c$_{i,j}^k$|≤1; and 1≤i≤2I, 1≤j≤R, and 1≤k≤N; and W$_2^k$ includes {c$_{1,1}^k$ c$_{2,1}^k$ . . . c$_{2I,1}^k$ c$_{1,2}^k$ . . . c$_{2I,R}^k$}, where there are at least i and j that make c$^k$=c$_{i,j}^k$ true; and a vector corresponding to c$_{i,j}^1$ c$_{i,j}^2$ . . . c$_{i,j}^N$ in W$_2^k$ is V$^{(i,j)}$.

In an example, $$W_1 = \begin{bmatrix} X_1 & 0 \\ 0 & X_1 \end{bmatrix},$$

X$_1$ is a matrix with $$\frac{N_t}{2}$$

rows and I columns, and X$_1$=[b$_1$ b$_2$ . . . b$_I$], where a vector b$_i$ is a column vector including $$\frac{N_t}{2}$$

elements, vectors b$_i$ are mutually orthogonal, 1≤i≤I, and I is a positive integer greater than or equal to 1.

In an example, p$_{i,j}$ in elements in $i^{th}$ rows and $j^{th}$ columns of all matrices W$_2^k$ is the same.

In an example, W$^k$ is a precoding matrix of a $k^{th}$ frequency domain subband.

In an example, W$^k$ is a frequency domain channel response of a $k^{th}$ frequency domain subband.

In an example, the first information includes indication information of R, and R is a rank of a channel matrix.

In an example, R is a quantity of receive antennas of the terminal.

In an example, an $l^{th}$ element $V^{(i,j)}(l)$ in L elements of vector $V^{(i,j)}$ and a first sequence S satisfies $D_l^{(i,j)}=V^{(i,j)}(l)\times S$, and $D_l^{(i,j)}$ is the indication information of the vector V.

In an example, an $l^{th}$ element in L elements in each vector $V^{(i,j)}$ is represented by using $n_l^{(i,j)}$ bits, where $1 \leq n_l^{(i,j)}$.

In an example, there are at least $l_1, l_2, i_1, i_2, j_1, j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied.

In an example, there are at least x and y that make $n_x^{(i,j)} \neq n_y^{(i,j)}$ true, where x is not equal to y.

In an example, there are at least $i_1, i_2, j_1, j_2$ that make a quantity of elements included in $V^{(i_1,j_1)}$ not equal to a quantity of elements included in $V^{(i_2,j_2)}$, where $i_1 \neq i_2$, or $j_1 \neq j_2$.

Figure 5:
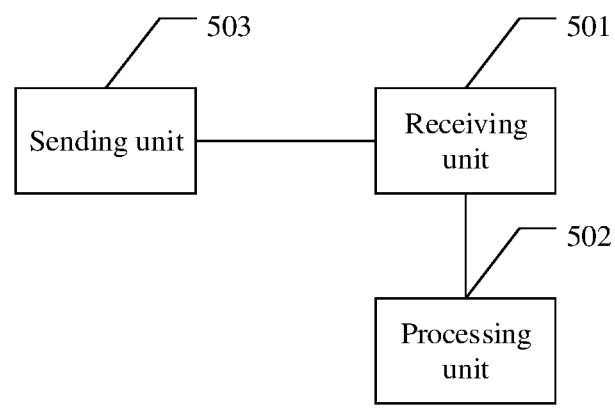
FIG. 5 is a schematic diagram of an embodiment of a network device according to an embodiment of this application.

Referring to FIG. 5, an embodiment of a network device according to an embodiment of this application includes:

a receiving unit 501, configured to receive first information, where the first information includes parameters q, $m_1, m_2, \ldots, m_L$, and indication information of a vector V; q is an integer, and $q<Q$; Q is an integer, and $Q>1$; $0 \leq m_l \leq N-1$, and $1 \leq l \leq L$; $L>1$, N, L, and l are integers, and N is a quantity of subbands in a frequency domain bandwidth; the vector V includes L elements and satisfies $V=F_q \times C$, where C is a vector formed by N elements $c^1, \ldots, c^N$, $C=[c^1\ c^2\ \ldots\ c^N]^T$, $c^k$ is used to indicate channel state information on a $k^{th}$ frequency domain subband, $c^k$ is a complex number, a modulus of $c^k$ is $|c^k| \leq 1$, and $1 \leq k \leq N$; and an $l^{th}$ row vector in the matrix $F_q$ satisfies:

$$F_q(l) = \left[1\ e^{j2\pi\frac{(m_l \times Q+q)}{N\times Q}}\ \ldots\ e^{j2\pi\frac{(m_l \times Q+q)}{N\times Q}(N-1)}\right];\ \text{or}$$

$$F_q(l) = \left[1\ e^{-j2\pi\frac{(m_l \times Q+q)}{N\times Q}}\ \ldots\ e^{-j2\pi\frac{(m_l \times Q+q)}{N\times Q}(N-1)}\right];$$

and a processing unit 502, configured to obtain channel state information based on the first information.

In an example, a $k^{th}$ element $c^k$ of the vector C is included in an element in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, where $W^k$ is the channel state information on the $k^{th}$ frequency domain subband;

$W^k$ is a matrix with $N_t$ rows and R columns, $W_1$ is a matrix with $N_t$ rows and 2I columns, where $2I \geq R$, and $W_2^k$ is a matrix with 2I rows and R columns; an element $W_2^k(i,j)$ in an $i^{th}$ row and a $j^{th}$ column in $W_2^k$ satisfies $W^k(i,j) = p_{i,j} \times c_{i,j}^k$, where $p_{i,j}$ is a real number and $0 \leq p_{i,j} \leq 1$, k is a complex number, and a modulus of $c_{i,j}^k$ satisfies $|c_{i,j}^k| \leq 1$; and $1 \leq i \leq 2I$, $1 \leq j \leq R$, and $1 \leq k \leq N$; and $W_2^k$ includes $\{c_{1,1}^k\ c_{2,1}^k\ \ldots\ c_{2I,1}^k\ c_{1,2}^k\ \ldots\ c_{2I,R}^k\}$, where there are at least i and j that make $c^k = c_{i,j}^k$ true; and a vector corresponding to $c_{i,j}^1\ c_{i,j}^2\ \ldots\ c_{i,j}^N$ in $W_2^k$ is $V^{(i,j)}$.

In an example, the network device further includes:

a sending unit 503, configured to send a reference signal to a terminal device, and the reference signal is used to determine the first information.

In an example, $$W_1 = \begin{bmatrix} X_1 & 0 \\ 0 & X_1 \end{bmatrix},$$

$X_1$ is a matrix with $$\frac{N_t}{2}$$

rows and I columns, and $X_1 = [b_1\ b_2\ \ldots\ b_I]$, where a vector $b_i$ is a column vector including $$\frac{N_t}{2}$$

elements, vectors $b_i$ are mutually orthogonal, $1 \leq i \leq I$, and I is a positive integer greater than or equal to 1.

In an example, $p_{i,j}$ in elements in $i^{th}$ rows and $j^{th}$ columns of all matrices $W_2^k$ is the same.

In an example, $W^k$ is a precoding matrix of a $k^{th}$ frequency domain subband.

In an example, $W^k$ is a frequency domain channel response of a $k^{th}$ frequency domain subband.

In an example, the first information includes indication information of R, and R is a rank of a channel matrix.

In an example, R is a quantity of receive antennas of the terminal.

In an example, an $l^{th}$ element $V^{(i,j)}(l)$ in L elements of vector $V^{(i,j)}$ and a first sequence S satisfies $D_l^{(i,j)} = V^{(i,j)}(l) \times S$, and $D_l^{(i,j)}$ is the indication information of the vector V.

In an example, an $l^{th}$ element in L elements in each vector $V^{(i,j)}$ is represented by using $n_l^{(i,j)}$ bits, where $1 \leq n_l^{(i,j)}$.

In an example, there are at least $l_1, l_2, i_1, i_2, j_1, j_2$ that make $n_{l_1}^{(i_1,j_1)} \neq n_{l_2}^{(i_2,j_2)}$ true, where at least one of inequations $l_1 \neq l_2$, $i_1 \neq i_2$, and $j_1 \neq j_2$ is satisfied.

In an example, there are at least x and y that make $n_x^{(i,j)} \neq n_y^{(i,j)}$ true, where x is not equal to y.

In an example, there are at least $i_1, i_2, j_1, j_2$ that make a quantity of elements included in $V^{(i_1,j_1)}$ not equal to a quantity of elements included in $V^{(i_2,j_2)}$, where $i_1 \neq i_2$ or $j_1 \neq j_2$.

The foregoing describes the terminal device and the network device in the embodiments of this application in detail in FIG. 4 and FIG. 5 from a perspective of a modular functional entity, and the following describes the terminal device and the network device in the embodiments of this application in detail from a perspective of hardware processing.

Figure 6A:
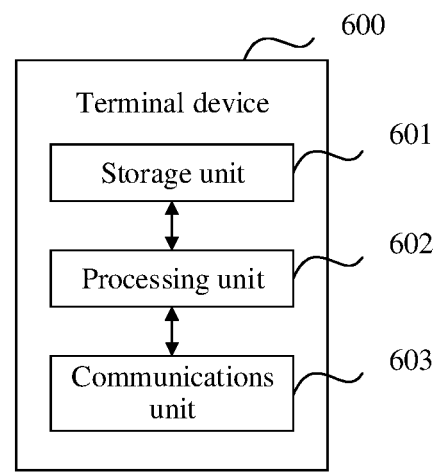
FIG. 6A is a schematic diagram of another embodiment of a terminal device according to an embodiment of this application.

FIG. 6A is a schematic structural diagram of a terminal device 600 according to an embodiment of this application. Referring to FIG. 6, when an integrated unit is used, FIG. 6A is a possible schematic structural diagram of the terminal device in the foregoing embodiments. The terminal device 600 includes a processing unit 602 and a communications unit 603. The processing unit 602 is configured to control and manage an action of the terminal device. For example, the processing unit 602 is configured to support the terminal device in performing step 302 and step 303 in FIG. 3, and/or another process in a technology described in this specification. The communications unit 603 is configured to support the terminal device in communicating with another network entity. The terminal device may further include a storage unit 601, configured to store program code and data of the terminal device.

The processing unit 602 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor may be a combination for implementing a computing function, for example, a combination of one or more microprocessors, or a combination of the DSP and a microprocessor. The communications unit 603 may be a communications interface, a transceiver, a transceiver circuit, or the like. The communications interface is a general term, and may include one or more interfaces, for example, a transceiver interface. The storage unit 601 may be a memory.

Figure 6B:
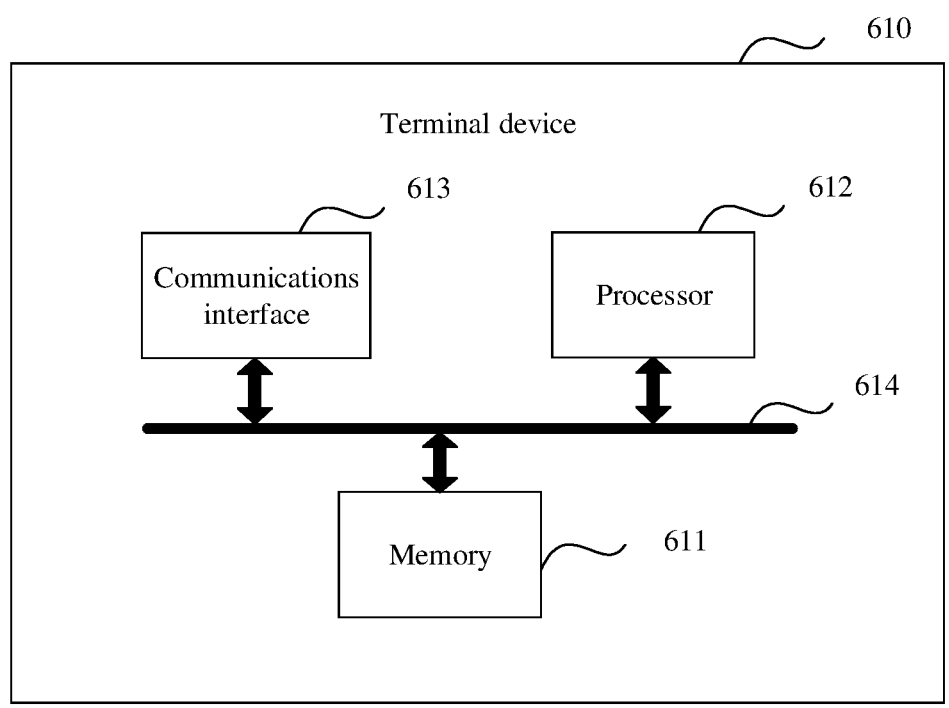
FIG. 6B is a schematic diagram of another embodiment of a terminal device according to an embodiment of this application.

When the processing unit 602 is a processor, the communications unit 603 is a communications interface, and the storage unit 601 is a memory, the terminal device in this embodiment of this application may be a terminal device 610 shown in FIG. 6B.

Referring to FIG. 6B, the terminal device 610 includes a processor 612, a communications interface 613, and a memory 611. Optionally, the terminal device 610 may further include a bus 614. The communications interface 613, the processor 612, and the memory 611 may be connected to each other by using the bus 614. The bus 614 may be a peripheral component interconnect (PCI) bus, an extended industry standard architecture (EISA) bus, or the like. The bus 614 may be classified into an address bus, a data bus, a control bus, and the like. For ease of representation, only one thick line is used to represent the bus in FIG. 6B, but this does not mean that there is only one bus or only one type of bus.

Figure 7:
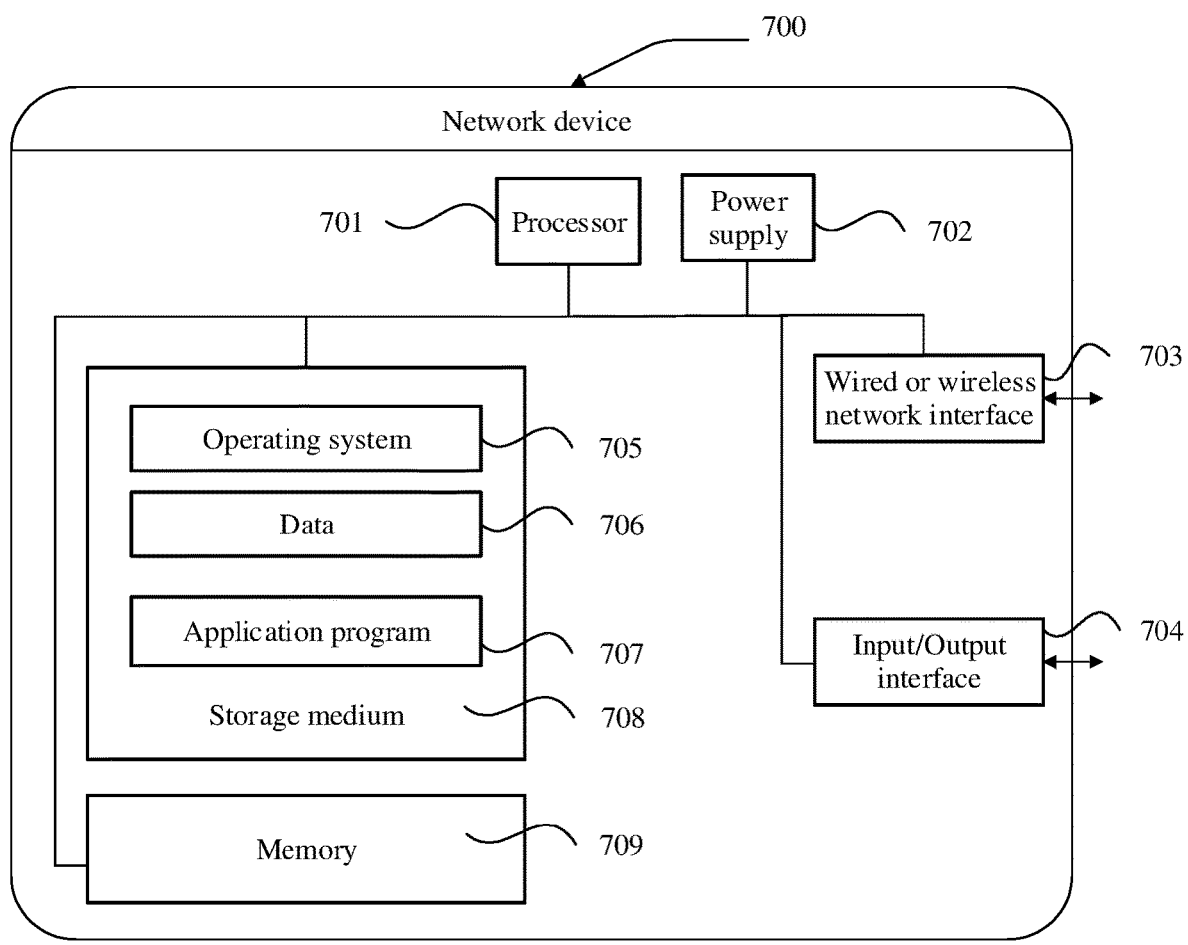
FIG. 7 is a schematic diagram of another embodiment of a network device according to an embodiment of this application.

FIG. 7 is a schematic structural diagram of a network device 700 according to an embodiment of this application. Relatively large differences in the network device may be generated because of configuration or performance differences. The network device may include one or more processors (central processing units, CPU) 701 (for example, one or more processors), a memory 709, one or more storage media 708 (for example, one or more mass storage devices) storing an application program 707 or data 706. The memory 709 and the storage medium 708 may be a transitory or persistent storage. A program stored in the storage medium 708 may include one or more foregoing modules (not shown in the figure). Each module may include a series of instruction operations for the network device. Further, the processor 701 may be configured to communicate with the storage medium 708, and perform, on the network device 700, the series of instruction operations in the storage medium 708.

The network device 700 may further include one or more power supplies 702, one or more wired or wireless network interfaces 703, one or more input/output interfaces 704, and/or one or more operating systems 705, for example, Windows Server, Mac OS X, Unix, Linux, or FreeBSD. A person skilled in the art may understand that a structure of the network device shown in FIG. 7 constitutes no limitation to the network device, and the network device may include more or fewer components than those shown in the figure, or a combination of some components, or components disposed differently.

The following describes each component of the network device in detail with reference to FIG. 7.

The memory 709 may be configured to store a software program and a module, and the processor 701 runs the software program and the module that are stored in the memory 709, to perform various functional applications of the network device and data processing. The memory 709 may mainly include a program storage area and a data storage area. The program storage area may store an operating system, an application program (such as a sound playing function or an image playing function) needed by at least one function, or the like. The data storage area may store data (such as a reference signal) created based on use of the network device, or the like. In addition, the memory 709 may include a high speed random access memory, and may further include a nonvolatile memory, such as at least one magnetic disk storage device, a flash storage device, or another volatile solid-state storage device. A program of the channel feedback method provided in this embodiment of this application and a received data stream are stored in the memory 709, and are invoked by the processor 701 from the memory 709 when the program and the received data stream need to be used.

The processor 701 is a control center of the network device, and may perform processing based on a set channel feedback method. The processor 701 is connected to all the parts of the entire network device by using various interfaces and lines, and perform various functions of the device and data processing by running or executing the software program and/or the module that are/is stored in the memory 709 and by invoking data stored in the memory 709, to feed back channel state information.

Figure 8:
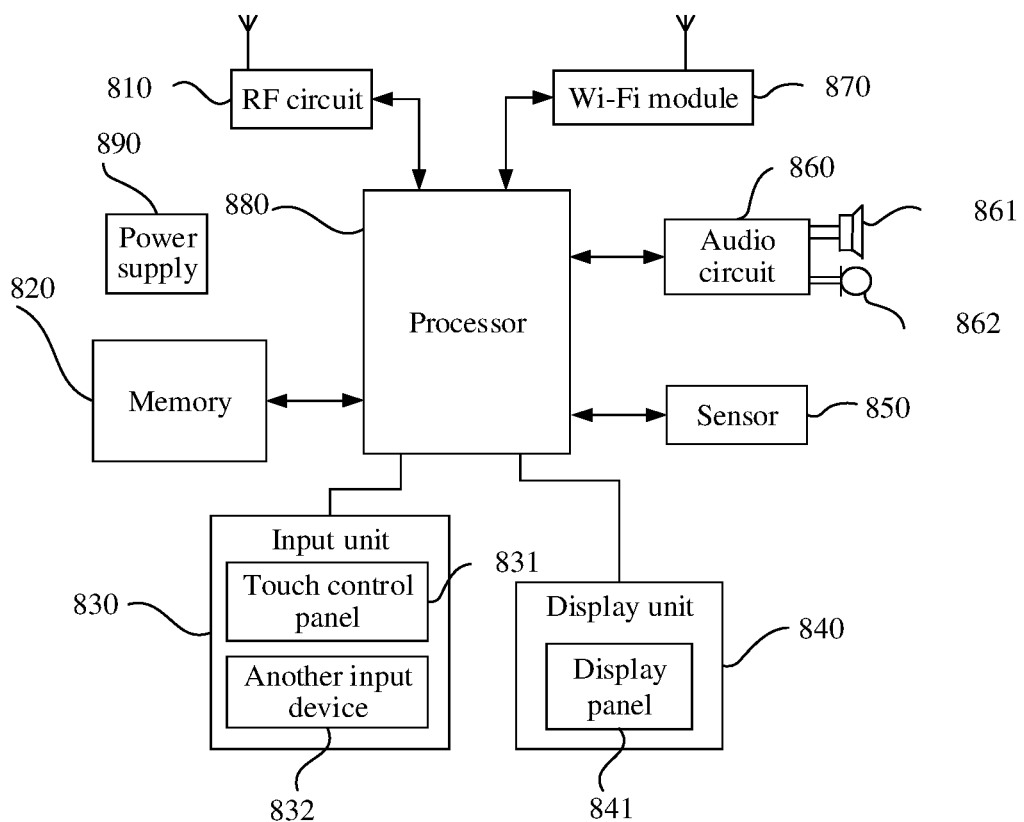
FIG. 8 is a schematic diagram of another embodiment of a terminal device according to an embodiment of this application.

The following specifically describes the components of the terminal device with reference to FIG. 8.

FIG. 8 is a partial structural block diagram of a terminal device according to an embodiment of this application. Referring to FIG. 8, the terminal device includes components such as a radio frequency (RF) circuit 810, a memory 820, an input unit 830, a display unit 840, a sensor 850, an audio frequency circuit 860, a wireless fidelity (Wi-Fi) module 870, and a processor 880. A person skilled in the art may understand that a structure of the terminal device shown in FIG. 8 constitutes no limitation to the terminal device, and the terminal device may include more or fewer components than those shown in the figure, or a combination of some components, or components disposed differently.

The processor 880 is a control center of the terminal device. In this embodiment of this application, first information that reflects channel state information may be generated based on a received reference signal, frequency domain compression is performed on a phase in first channel state information, and proper q and $m_l$ are selected, where l=1, 2, . . . , L, so that energy dispersion caused after a Fourier transform operation is greatly reduced, thereby reducing a quantity of coefficients that need to be reported, and reducing uplink resource overheads.

The RF circuit 810 is connected to the processor 880 by using a bus, is responsible for sending data to the Internet or receiving data from the Internet, and may be further configured to send and receive a signal in an information sending and receiving process or a call process. Particularly, after receiving downlink information from a network device (e.g., a base station), the RF circuit 810 sends the downlink information to the processor 880 for processing. In addition, uplink data is sent to the network device. Usually, the RF circuit 810 includes but is not limited to an antenna, at least one amplifier, a transceiver, a coupler, a low noise amplifier (low noise amplifier, LNA), a duplexer, and the like. In addition, the RF circuit 810 may further communicate with a network and other devices through wireless communication. The foregoing wireless communication may use any communications standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 820 may be configured to store a software program and a module, and the processor 880 runs the software program and the module that are stored in the memory 820, to perform various functional applications of the terminal device and data processing. The memory 820 may mainly include a program storage area and a data storage area. The program storage area may store an operating system, an application program (for example, a function of generating first information and a frequency domain compression function) needed by at least one function, or the like. The data storage area may store data (such as first channel state information and a precoding matrix) created based on use of a mobile terminal, or the like. In addition, the memory 820 may include a high speed random access memory, and may further include a nonvolatile memory, for example, at least one magnetic disk storage device, a flash storage device, or another volatile solid-state storage device.

The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A method, comprising:
   generating, by a terminal device, first information, wherein the first information comprises parameters q, $m_1, m_2, \ldots, m_L$, and indication information of a vector V, q is an integer less than Q, Q is an integer greater than 1, $0 \le m_l \le N-1$, $1 \le l \le L$, L is greater than 1, N, L, and l are integers, N is a quantity of subbands in a frequency domain bandwidth, the vector V comprises L elements and satisfies $V = F_q \times C$, C is a vector of N elements $c^1, \ldots, c^N$, $C = [c^1\ c^2\ \ldots\ c^N]^T$, $c^k$ indicates channel state information on a $k^{th}$ frequency domain subband, $c^k$ is a complex number, a modulus of $c^k$ is less than or equal to 1, $1 \le k \le N$, and an $l^{th}$ row vector in a matrix $F_q$ satisfies:

$$F_q(l) = \left[1\ e^{j2\pi\frac{(m_l \times Q + q)}{N \times Q}} \ \ldots\ e^{j2\pi\frac{(m_l \times Q + q)}{N \times Q}(N-1)}\right]; \text{ or}$$

$$F_q(l) = \left[1\ e^{-j2\pi\frac{(m_l \times Q + q)}{N \times Q}} \ \ldots\ e^{-j2\pi\frac{(m_l \times Q + q)}{N \times Q}(N-1)}\right];$$

and
   sending, by the terminal device, the first information to a network device.

2. The method according to claim 1, wherein a $k^{th}$ element $c^k$ of the vector C is comprised in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, wherein:
   $W^k$ is the channel state information on the $k^{th}$ frequency domain subband;
   $W^k$ is a matrix with $N_t$ rows and R columns, $W_1$ is a matrix with $N_t$ rows and 2I columns, $2I \le R$, and $W_2^k$ is a matrix with 2I rows and R columns;
   an element $W_2^k(i,j)$ in an $i^{th}$ row and a $j^{th}$ column in $W_2^k$ satisfies $W_2^k(i,j) = p_{i,j} \times c_{i,j}^k$;
   $p_{i,j}$ is a real number greater than or equal to zero and less than or equal to one, $c_{i,j}^k$ is a complex number, and a modulus of $c_{i,j}^k$ is less than or equal to 1;
   $1 \le i \le 2I$, $1 \le j \le R$, and $1 \le k \le N$;
   $W_2^k$ comprises $\{c_{1,1}^k\ c_{2,1}^k \ldots c_{2I,1}^k\ c_{1,2}^k \ldots c_{2I,R}^k\}$, i and j satisfy $c^k = c_{i,j}^k$; and
   a vector corresponding to $c_{i,j}^1\ c_{i,j}^2 \ldots c_{i,j}^N$ in $W_2^k$ is $V^{(i,j)}$.

3. The method according to claim 2, wherein $$W_1 = \begin{bmatrix} X_1 & 0 \\ 0 & X_1 \end{bmatrix},$$

$X_1$ is a matrix with $$\frac{N_t}{2}$$

rows and I columns, $X_1 = [b_1\ b_2\ \ldots\ b_I]$, each of one or more vectors $b_i$ is a column vector comprising $$\frac{N_t}{2}$$

elements, the one or more vectors $b_i$ are mutually orthogonal, $1 \le i \le I$, and I is a positive integer greater than or equal to 1.

4. The method according to claim 2, wherein an element $p_{i,j}$ in a $i^{th}$ row and a $j^{th}$ column of each second matrix $W_2^k$ is the same.

5. The method according to claim 2, wherein $W^k$ is a precoding matrix of the $k^{th}$ frequency domain subband.

6. The method according to claim 5, wherein the first information comprises indication information of R, and R is a rank of a channel matrix.

7. The method according to claim 2, wherein $W^k$ is a frequency domain channel response of the $k^{th}$ frequency domain subband.

8. A method, comprising:
   receiving, by a network device, first information from a terminal device, wherein the first information comprises parameters q, $m_1$, $m_2$, ..., $m_L$, and indication information of a vector V, q is an integer less than Q, Q is an integer greater than 1, $0 \leq m_l \leq N-1$, $1 \leq l \leq L$, L is greater than 1, N, L, and l are integers, N is a quantity of subbands in a frequency domain bandwidth, the vector V comprises L elements and satisfies $V = F_q \times C$, C is a vector of N elements $c^1, \ldots, c^N$, $C = [c^1 \; c^2 \; \ldots \; c^N]^T$, $c^k$ indicates channel state information on a $k^{th}$ frequency domain subband, $c^k$ is a complex number, a modulus of $c^k$ is less than or equal to 1, $1 \leq k \leq N$, and an $l^{th}$ row vector in a matrix $F_q$ satisfies:

$$F_q(l) = \left[ 1 \; e^{j2\pi \frac{(m_l \times Q + q)}{N \times Q}} \; \ldots \; e^{j2\pi \frac{(m_l \times Q + q)}{N \times Q}(N-1)} \right]; \text{ or}$$

$$F_q(l) = \left[ 1 \; e^{-j2\pi \frac{(m_l \times Q + q)}{N \times Q}} \; \ldots \; e^{-j2\pi \frac{(m_l \times Q + q)}{N \times Q}(N-1)} \right];$$

and
   obtaining, by the network device, channel state information according to the first information.

9. The method according to claim 8, wherein a $k^{th}$ element $c^k$ of the vector C is comprised in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, wherein:
   $W^k$ is the channel state information on the $k^{th}$ frequency domain subband;
   $W^k$ is a matrix with $N_t$ rows and R columns, $W_1$ is a matrix with $N_t$ rows and 2I columns, $2I \geq R$, and $W_2^k$ is a matrix with 2I rows and R columns;
   an element $W_2^k(i,j)$ in an $i^{th}$ row and a $j^{th}$ column in $W_2^k$ satisfies $W_2^k(i,j) = p_{i,j} \times c_{i,j}^k$;
   $p_{i,j}$ is a real number greater than or equal to zero and less than or equal to one, $c_{i,j}^k$ is a complex number, and a modulus of $c_{i,j}^k$ is less than or equal to 1;
   $1 \leq i \leq 2I$, $1 \leq j \leq R$, and $1 \leq k \leq N$;
   $W_2^k$ comprises $\{c_{1,1}^k \; c_{2,1}^k \; \ldots \; c_{2I,1}^k \; c_{1,2}^k \; \ldots \; c_{2I,R}^k\}$, i and j satisfy $c^k = c_{i,j}^k$; and
   a vector corresponding to $c_{i,j}^1 \; c_{i,j}^2 \; \ldots \; c_{i,j}^N$ in $W_2^k$ is $V^{(i,j)}$.

10. The method according to claim 8, wherein $$W_1 = \begin{bmatrix} X_1 & 0 \\ 0 & X_1 \end{bmatrix},$$

$X_1$ is a matrix with $$\frac{N_t}{2}$$

rows and I columns, $X_1 = [b_1 \; b_2 \; \ldots \; b_I]$, each of one or more vectors $b_i$ is a column vector comprising $$\frac{N_t}{2}$$

elements, the one or more vectors $b_i$ are mutually orthogonal, $1 \leq i \leq I$, and I is a positive integer greater than or equal to 1.

11. The method according to claim 8, wherein an element $p_{i,j}$ in an $i^{th}$ row and a $j^{th}$ column of each second matrix $W_2^k$ is the same.

12. The method according to claim 8, wherein $W^k$ is a precoding matrix of the $k^{th}$ frequency domain subband.

13. The method according to claim 12, wherein the first information comprises indication information of R, and R is a rank of a channel matrix.

14. The method according to claim 8, wherein $W^k$ is a frequency domain channel response of the $k^{th}$ frequency domain subband.

15. A terminal device, comprising:
   at least one processor, configured to generate first information, wherein the first information comprises parameters q, $m_1$, $m_2$, ..., $m_L$, and indication information of a vector V, q is an integer less than Q; Q is an integer greater than 1, $0 \leq m_l \leq N-1$, $1 \leq l \leq L$, $L > 1$, N, L, and l are integers, N is a quantity of subbands in a frequency domain bandwidth, the vector V comprises L elements and satisfies $V = F_1 \times C$, C is a vector of N elements $c^1, \ldots, c^N$, $C = [c^1 \; c^2 \; \ldots \; c^N]^T$, $c^k$ indicates channel state information on a $k^{th}$ frequency domain subband, $c^k$ is a complex number, a modulus of $c^k$ is less than or equal to 1, $1 \leq k \leq N$, and an $l^{th}$ row vector in a matrix $F_q$ satisfies:

$$F_q(l) = \left[ 1 \; e^{j2\pi \frac{(m_l \times Q + q)}{N \times Q}} \; \ldots \; e^{j2\pi \frac{(m_l \times Q + q)}{N \times Q}(N-1)} \right]; \text{ or}$$

$$F_q(l) = \left[ 1 \; e^{-j2\pi \frac{(m_l \times Q + q)}{N \times Q}} \; \ldots \; e^{-j2\pi \frac{(m_l \times Q + q)}{N \times Q}(N-1)} \right];$$

and
   a transceiver, configured to send the first information to a network device.

16. The terminal device according to claim 15, wherein a $k^{th}$ element $c^k$ of the vector C is comprised in an $i^{th}$ row and a $j^{th}$ column of a second matrix $W_2^k$ of the $k^{th}$ frequency domain subband, and the second matrix $W_2^k$ and a first matrix $W_1$ satisfy: $W^k = W_1 \times W_2^k$, wherein:
   $W^k$ is the channel state information on the $k^{th}$ frequency domain subband;
   $W^k$ is a matrix with $N_t$ rows and R columns, $W_1$ is a matrix with $N_t$ rows and 2I columns, $2I \leq R$, and $W_2^k$ is a matrix with 2I rows and R columns;
   an element $W_2^k(i,j)$ in an $i^{th}$ row and a $j^{th}$ column in $W_2^k$ satisfies $W_2^k(i,j) = p_{i,j} \times c_{i,j}^k$;
   $p_{i,j}$ is a real number greater than or equal to zero and less than or equal to one, $c_{i,j}^k$ is a complex number, and a modulus is less than or equal to 1;
   $1 \leq i \leq 2I$, $1 \leq j \leq R$, and $1 \leq k \leq N$;
   $W_2^k$ comprises $\{c_{1,1}^k \; c_{2,1}^k \; \ldots \; c_{2I,1}^k \; c_{1,2}^k \; \ldots \; c_{2I,R}^k\}$, i and j satisfy $c^k = c_{i,j}^k$; and
   a vector corresponding to $c_{i,j}^1 \; c_{i,j}^2 \; \ldots \; c_{i,j}^N$ in $W_2^k$ is $V^{(i,j)}$.

17. The terminal device according to claim 16, wherein $$W_1 = \begin{bmatrix} X_1 & 0 \\ 0 & X_1 \end{bmatrix},$$

$X_1$ is a matrix with $\frac{N_t}{2}$ rows and I columns, $X_1 = [b_1 \ b_2 \ \ldots \ b_I]$, each of one or more vectors $b_i$ is a column vector comprising $\frac{N_t}{2}$ elements, the one or more vectors $b_i$ are mutually orthogonal, $1 \leq i \leq I$, and I is a positive integer greater than or equal to 1.

18. The terminal device according to claim 16, wherein an element $p_{i,j}$ an $i^{th}$ row and a $j^{th}$ column of each second matrix $W_2^k$ is the same.

19. The terminal device according to claim 16, wherein $W^k$ is a precoding matrix of the $k^{th}$ frequency domain subband.

20. The terminal device according to claim 16, wherein $W^k$ is a frequency domain channel response of the $k^{th}$ frequency domain subband.

* * * * *

UNITED STATES PATENT AND TRADEMARK OFFICE
CERTIFICATE OF CORRECTION

PATENT NO. : 11,265,045 B2
APPLICATION NO. : 16/811002
DATED : March 1, 2022
INVENTOR(S) : Ruiqi Zhang It is certified that error appears in the above-identified patent and that said Letters Patent is hereby corrected as shown below:

In the Claims

Claim 1, Column 25, Line 64; delete "$1 \leq 1 \leq L$" and insert -- $1 \leq l \leq L$ --.

Claim 1, Column 25, Line 65; delete "1" and insert -- $l$ --.

Claim 1, Column 26, Line 4; delete "$1^{th}$" and insert -- $l^{th}$ --.

Claim 8, Column 27, Line 9; delete "$1 \leq 1 \leq L$" and insert -- $1 \leq l \leq L$ --.

Claim 8, Column 27, Line 10; delete "1" and insert -- $l$ --.

Claim 8, Column 27, Line 16; delete "$1^{th}$" and insert -- $l^{th}$ --.

Claim 15, Column 28, Line 21; delete "$1 \leq 1 \leq L$" and insert -- $1 \leq l \leq L$ --.

Claim 15, Column 28, Line 21; delete "1" and insert -- $l$ --.

Claim 15, Column 28, Line 24; delete "$V=F_1 \times C$" and insert -- $V=F_q \times C$ --.

Claim 15, Column 28, Line 28; delete "$1^{th}$" and insert -- $l^{th}$ --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*